United States Patent [19]

Klappert et al.

[11] Patent Number: 4,942,551
[45] Date of Patent: Jul. 17, 1990

[54] METHOD AND APPARATUS FOR STORING MIDI INFORMATION IN SUBCODE PACKS

[75] Inventors: Walter R. Klappert, Topanga; Alan J. McPherson, Burbank, both of Calif.

[73] Assignee: WNM Ventures Inc., Burbank, Calif.

[21] Appl. No.: 211,355

[22] Filed: Jun. 24, 1988

[51] Int. Cl.⁵ .................. G11B 7/00; G11B 20/00; G06F 3/06

[52] U.S. Cl. .................. 364/900; 360/32; 360/48; 369/47; 84/1.01; 364/916.5; 364/952.31; 364/952; 364/966; 364/968.1; 364/927.83

[58] Field of Search ... 364/200 MS File, 900 MS File; 360/25, 27, 32, 47, 48; 84/1.01, 1.24; 369/47, 48, 50

[56] References Cited

U.S. PATENT DOCUMENTS

| | | | |
|---|---|---|---|
| 4,587,643 | 5/1986 | Monen et al. | 369/32 |
| 4,631,714 | 12/1986 | Kahlman et al. | 369/59 |
| 4,646,170 | 2/1987 | Kobayashi et al. | 360/22 |
| 4,675,857 | 6/1987 | Schylander | 369/59 |
| 4,682,317 | 7/1987 | Tomisawa | 369/59 |
| 4,707,818 | 11/1987 | Suzuki et al. | 369/59 |
| 4,760,566 | 7/1988 | Kobayashi et al. | 369/48 |
| 4,769,802 | 9/1988 | Tatsuduguchi | 369/46 |
| 4,771,671 | 9/1988 | Hoff, Jr. | 84/1.01 |
| 4,777,857 | 10/1988 | Stewart | 84/1.01 |
| 4,789,975 | 12/1988 | Taniyama | 369/50 |

Primary Examiner—Gareth D. Shaw
Assistant Examiner—Kevin A. Kriess
Attorney, Agent, or Firm—Blakely, Sokoloff, Taylor & Zafman

[57] ABSTRACT

The present invention is an apparatus and method for ecoding data in MIDI (Musical Instrument Digital Interface) format on an audio compact disc without affecting the digitized sound stored in the main channel by utilizing what is known as the subcode channel of the compact disc which is reserved for information other than digitized compact disc audio data. The invention is directed to a technique for converting MIDI information generated by a MIDI source (for example, a keyboard or sequencer) into subcode data which may be recorded on a transportable floppy diskettes or other transportable media for subsequent conversion to signals which are input to a compact disc encoder which places the MIDI information into the subcode channel.

23 Claims, 11 Drawing Sheets

Fig. 1a

| R | S | T | U | V | W |
|---|---|---|---|---|---|
| | | | ITEM | | |
| 0 | | | | | |
| 1 | MODE COMMAND | | | | |
| 2 | PARITY Q0 | | | | |
| 3 | PARITY Q1 | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | PARITY P0 | | | | |
| 21 | PARITY P1 | | | | |
| 22 | PARITY P2 | | | | |
| 23 | PARITY P3 | | | | |

Fig. 1b

| | R | S | T | U | V | W |
|---|---|---|---|---|---|---|
| | 1 | 1 | 1 | | ITEM | |
| 0 | 1 | 1 | 1 | | | |
| 1 | COMMAND | | | | | |
| 2 | PARITY Q0 | | | | | |
| 3 | PARITY Q1 | | | | | |
| 4 | MIDI BYTE 1 | | | | | |
| 5 | | | | MIDI BYTE 2 | | |
| 6 | MIDI BYTE 3 | | | | | |
| 7 | MIDI BYTE 4 | | | | | |
| 8 | | | | MIDI BYTE 5 | | |
| 9 | MIDI BYTE 6 | | | | | |
| 10 | MIDI BYTE 7 | | | | | |
| 11 | | | | MIDI BYTE 8 | | |
| 12 | MIDI BYTE 9 | | | | | |
| 13 | MIDI BYTE 10 | | | | | |
| 14 | No. of MIDI Bytes | | | | | |
| 15 | 0 | 0 | 0 | 0 | 0 | 0 |
| 16 | 0 | 0 | 0 | 0 | 0 | 0 |
| 17 | PARITY P0 | | | | | |
| 18 | PARITY P1 | | | | | |
| 19 | PARITY P2 | | | | | |
| 20 | PARITY P3 | | | | | |

Fig. 1c

| | R | S | T | U | V | W |
|---|---|---|---|---|---|---|
| 0 | 1 | 1 | 1 | ITEM | | |
| 1 | 0 | 0 | 0 | No. of MIDI Bytes | | |
| 2 | | | | PARITY Q0 | | |
| 3 | | | | PARITY Q1 | | |
| 4 | | | | MIDI BYTE 1 | | |
| 5 | | | | | MIDI BYTE 2 | |
| 6 | | | | MIDI BYTE 3 | | |
| 7 | | | | MIDI BYTE 4 | | |
| 8 | | | | | MIDI BYTE 5 | |
| 9 | | | | | | |
| 10 | | | | MIDI BYTE 6 | | |
| 11 | | | | MIDI BYTE 7 | | |
| 12 | | | | | MIDI BYTE 8 | |
| 13 | | | | | | |
| 14 | | | | MIDI BYTE 9 | | |
| 15 | | | | MIDI BYTE 10 | | |
| 16 | | | | | MIDI BYTE 11 | |
| 17 | | | | | | |
| 18 | 0 | 0 | 0 | | 0 | 0 |
| 19 | 0 | 0 | 0 | | 0 | 0 |
| 20 | | | | PARITY P0 | | |
| 21 | | | | PARITY P1 | | |
| 22 | | | | PARITY P2 | | |
| 23 | | | | PARITY P3 | | |

Fig. 1d

| | R | S | T | U | V | W |
|---|---|---|---|---|---|---|
| 0 | 1 | 1 | 1 | ITEM | | |
| 1 | 0 | 0 | 1 | No. of MIDI Bytes | | |
| 2 | | | | PARITY Q0 | | |
| 3 | | | | PARITY Q1 | | |
| 4 | | | | MIDI BYTE 1 | | |
| 5 | | | | | MIDI BYTE 2 | |
| 6 | | | | MIDI BYTE 3 | | |
| 7 | | | | MIDI BYTE 4 | | |
| 8 | | | | | MIDI BYTE 5 | |
| 9 | | | | | | |
| 10 | | | | MIDI BYTE 6 | | |
| 11 | | | | MIDI BYTE 7 | | |
| 12 | | | | | MIDI BYTE 8 | |
| 13 | | | | | | |
| 14 | | | | MIDI BYTE 9 | | |
| 15 | | | | MIDI BYTE 10 | | |
| 16 | | | | | MIDI BYTE 11 | |
| 17 | | | | | | |
| 18 | | | | | MIDI BYTE 12 | |
| 19 | | | | PARITY P0 | | |
| 20 | | | | PARITY P1 | | |
| 21 | | | | PARITY P2 | | |
| 22 | | | | PARITY P3 | | |

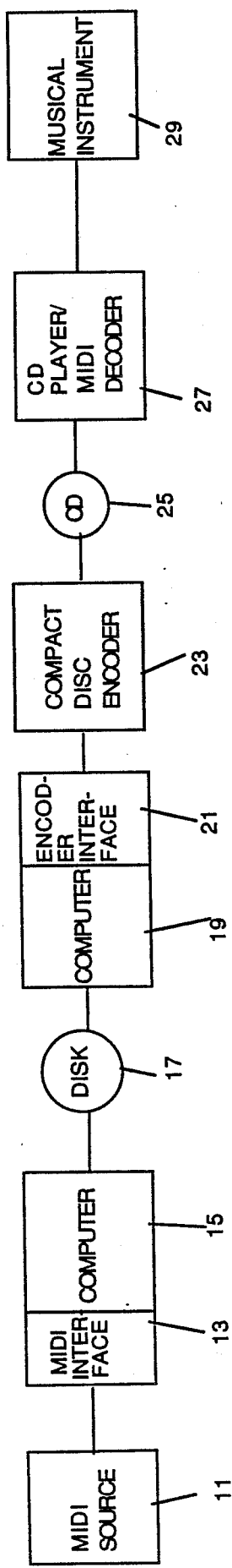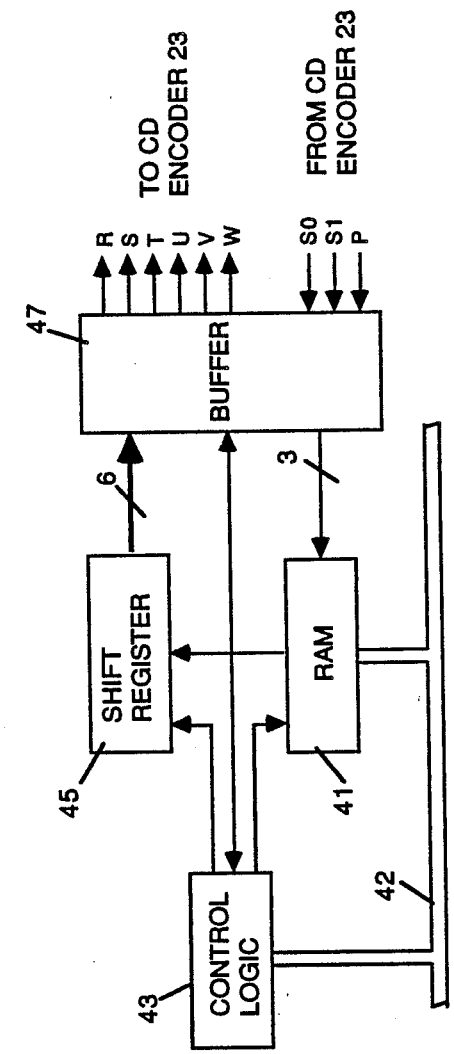

METHOD AND APPARATUS FOR STORING MIDI INFORMATION IN SUBCODE PACKS

SUMMARY OF THE INVENTION

The present invention is an apparatus and method for encoding data in MIDI (Musical Instrument Digital Interface) format on an audio compact disc without affecting the digitized sound stored in the main channel by utilizing what is known as the subcode channel of the compact disc which is reserved for information other than digitized compact disc audio data. Presently, audio compact discs use 95% of their capacity to store digitized sound, leaving 5% for what is called the subcode channel or area. The subcode channel, which corresponds to about 30 megabytes of data capacity, to the extent it is utilized at all, is used for graphics information. In order to play back graphics subcode data, it is necessary for a compact disc player to include a graphics decoder to decode the graphics subcode data. To make MIDI encoded data stored in the subcode area available to a MIDI device, it is necessary to add a connector into which a cable from the MIDI device is plugged into the compact disc player and modify the player to include subcode decoding circuitry. In this connection, if a compact disc player includes a graphics decoder, most of the necessary circuitry would be included in the graphics decoder. If a graphics decoder is not present, the necessary circuitry would need to be added to take advantage of MIDI data encoded on a compact disc according to present invention.

By making the MIDI information placed on a compact disc available to a MIDI device, a user can add MIDI information from other sources and/or change the MIDI information so as to change the sounds of instruments, rearrange the sound of songs, change their tempo and key, and otherwise creatively modify music for new listening experiences and education. For example, by changing the key of a song, one can sing along in his or her own vocal range, or by directing the MIDI information to a set of musical instruments which are different from the original instruments, the user can change the orchestration. All this is accomplished without affecting in any way the original digitized music recorded on the compact disc.

BRIEF DESCRIPTION OF THE DRAWINGS

FIG. 1a shows the format of a subcode data pack for a compact disc.

FIG. 1b shows an encoding scheme for storing MIDI data in a subcode data pack using 10 bytes of MIDI data per pack.

FIG. 1c shows an encoding scheme for storing MIDI data in a subcode data pack using 11 bytes of MIDI data per pack.

FIG. 1d shows an encoding scheme for storing MIDI data in a subcode data pack using 12 bytes of MIDI data per pack.

FIG. 2 is a block diagram showing the components needed to practice the present invention.

FIG. 3 is a schematic of a circuit for implementing encoder interface logic 21.

DETAILED DESCRIPTION OF THE INVENTION

Figure 4A:
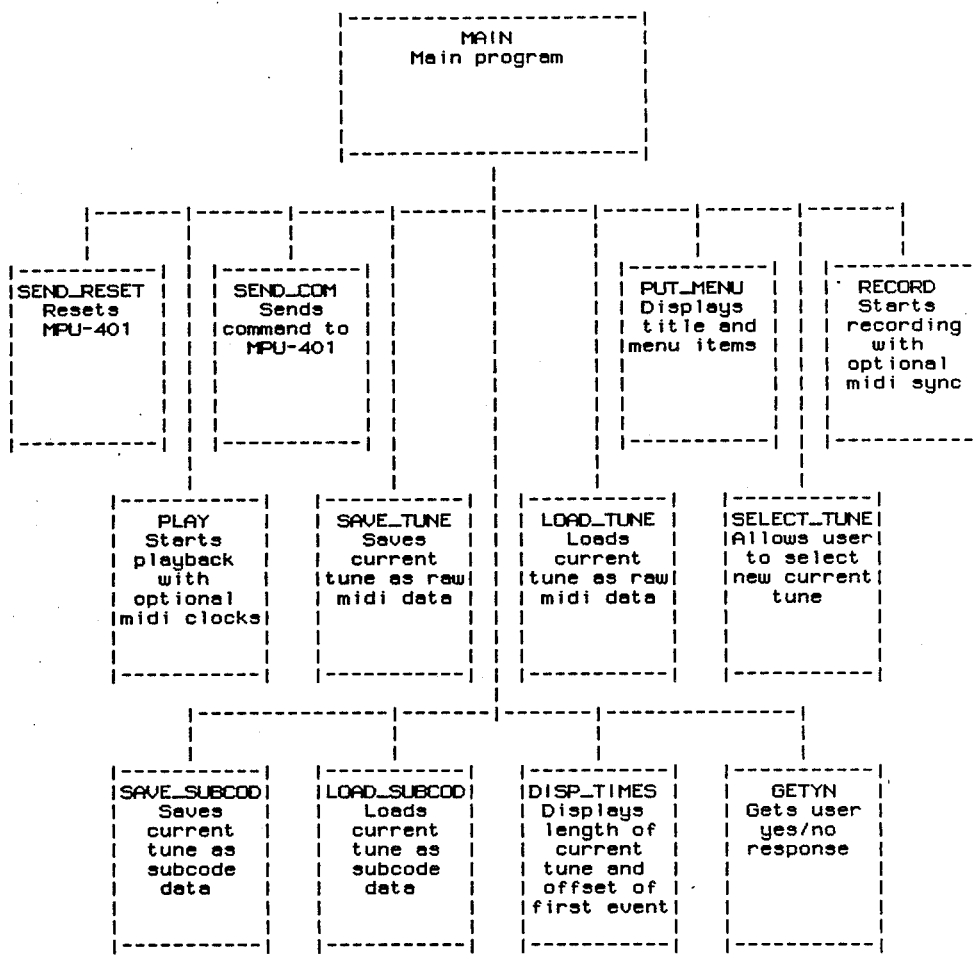
FIGS. 4a-4h show a hierarchical diagram of a computer program for converting raw MIDI data to subcode data.
Figure 4B:
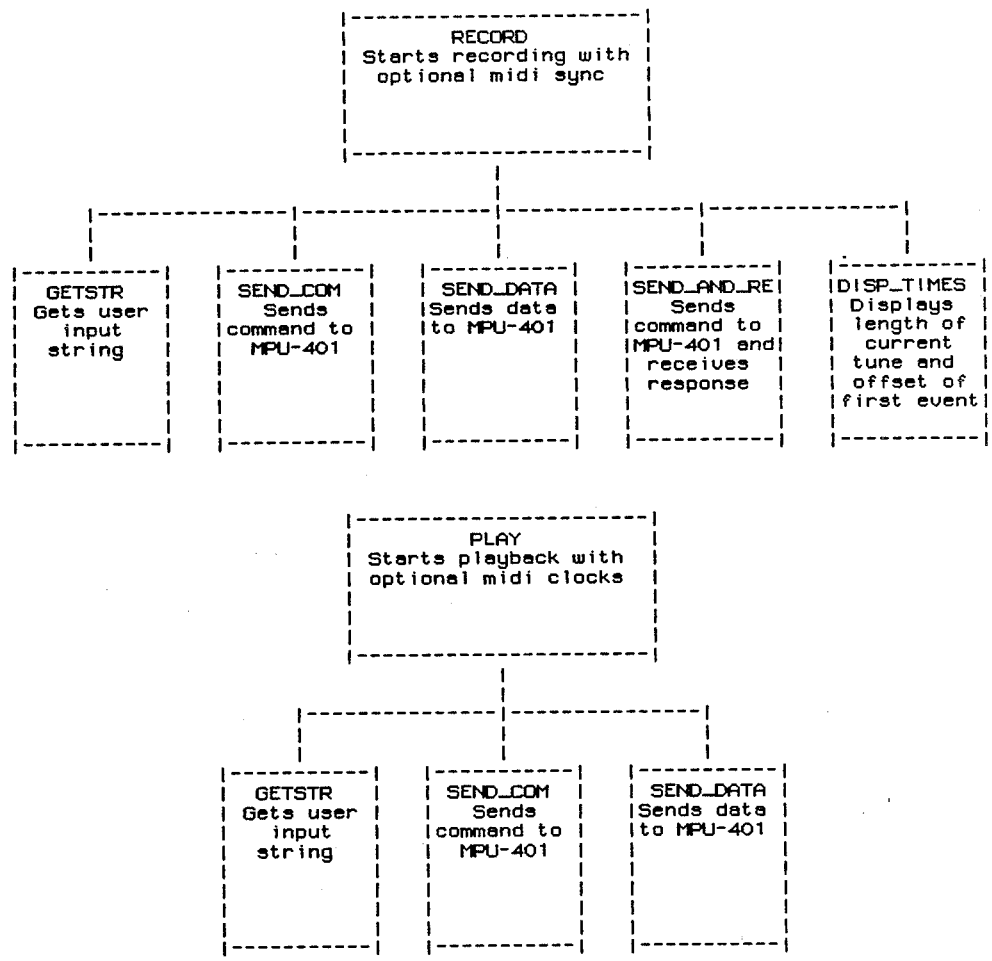
Figure 4C:
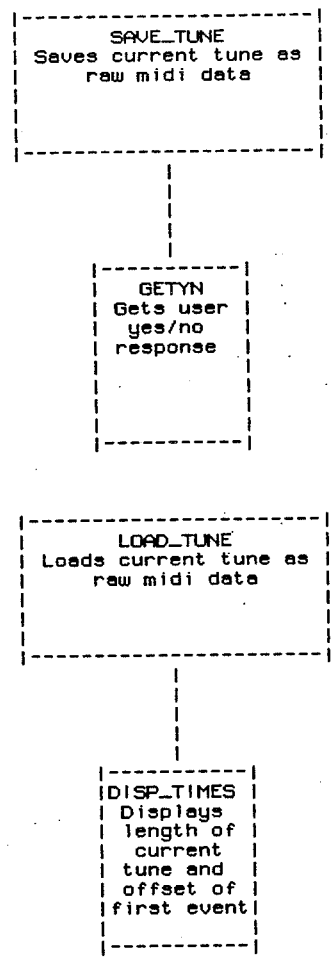
Figure 4D:
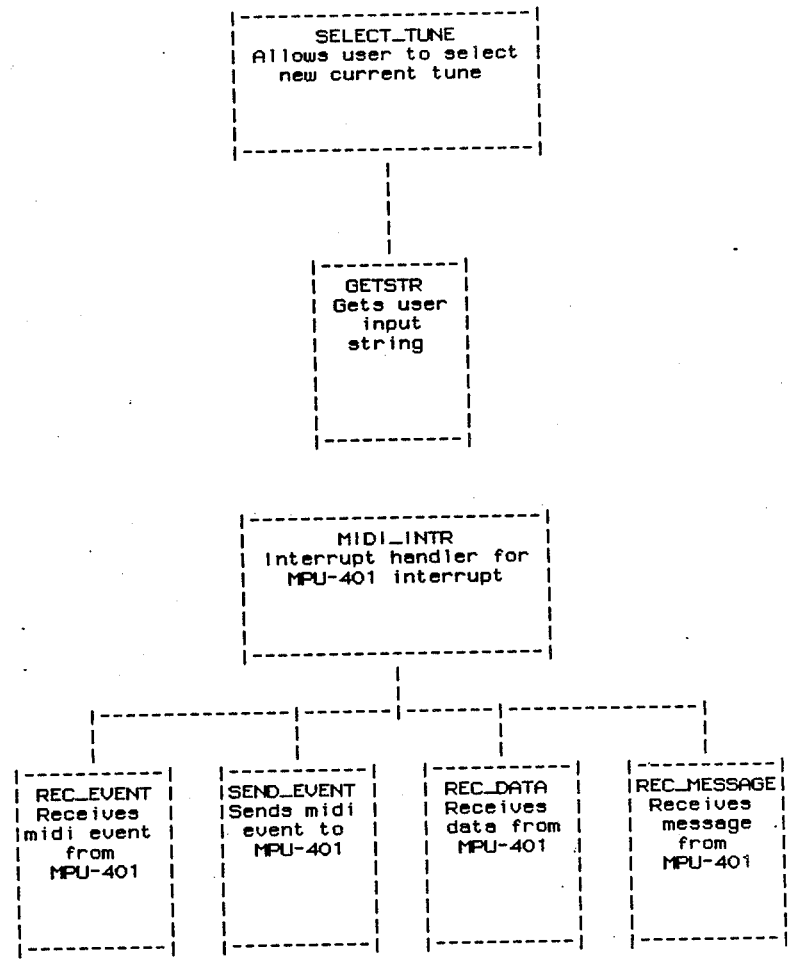
Figure 4E:
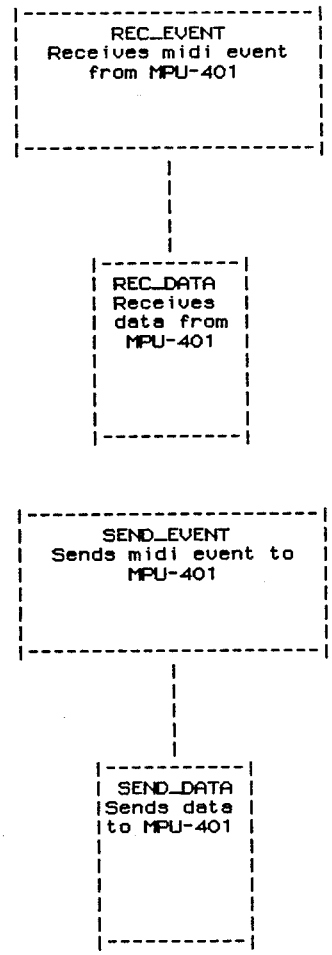
Figure 4F:
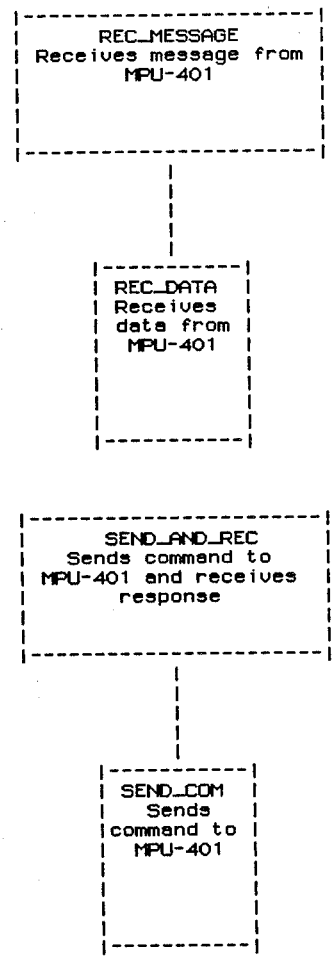
Figure 4G:
Figure 4H:
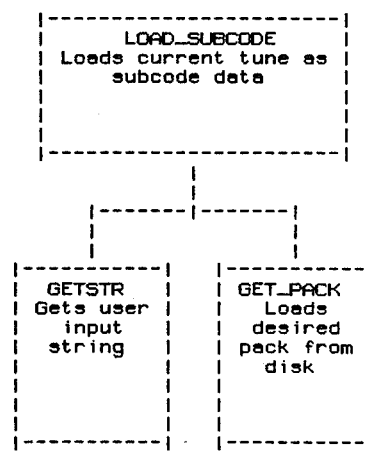

Audio compact discs, by an industry standard, set aside 5% of the possible data storage for non compact disc audio. In other words, 95% of the possible data storage is used to store the digitized audio recording. The reserved 5% portion known as the subcode channel, in effect, stores purely numerical data in a specified format. In particular, data in the subcode channel is stored in packs of 24 words with each word consisting of 6 bits labeled R, S, T, U, V and W respectively as shown in FIG. 1a. Each of the bits in the subcode channel is one of 6 sub channels. Details regarding the format of subcode data on a compact disc are set forth in a document known as the "Red Book" which is a technical specification created by Philips N.V. and Sony Corporation entitled "Compact Disc Digital Audio System Description." The foregoing details are found in the section entitled "Sub Channels R, S, T, U, V and W."

The invention is directed to a technique for converting MIDI information generated by a MIDI source (for example, a keyboard or sequencer) into subcode data which may be recorded on a transportable hard disk or floppy diskettes for subsequent conversion to signals which are input to a compact disc encoder which places the MIDI information into the subcode channel. Alternatively, the subcode data may be directly converted into a form usable by a compact disc encoding device. A block diagram illustrating the various components needed to convert the MIDI information into data which may be encoded into the subcode channel of a compact disc is shown in FIG. 2 as MIDI source 11, MIDI interface 13 which is an interface board for enabling the MIDI data to be input to computer 15, computer 15 which performs the conversion from MIDI data to subcode data, disk 17 which stores the subcode data, computer 19 with encoder interface logic 21 for generating signals to be input to compact disc encoding device 23, and compact disc encoding device 23 which places digitized audio main channel data and subcode data onto compact disc 25. Also shown for completeness are compact disc player with MIDI decoder 27 whose output is used to drive musical instrument 29.

MIDI source 11 may be any source of MIDI data such as a keyboard with a MIDI port or a sequencer. Such components are readily available from a variety of manufacturers. MIDI interface board 13 is a commercially available product such as a Voyetra OP-4000/1 board based on Roland's MPU-401 technology. Details regarding such board may be found in the OP-4000/1 Intelligent PC/MIDI Interface Technical Reference Manual published by Voyetra. Computers 15 and 19 may be any general purpose digital computer. In the preferred embodiment, an IBM PC/AT or compatible is used. The software necessary to convert the MIDI data from board 13 to subcode data will be described below. The subcode data created by the software in computer 15 is written to disk 17 which is a standard floppy diskette or another transportable medium for data storage. A transportable medium is used because the MIDI data is generally created at a different time and place than that at which the compact disc is encoded with the digitized compact disc audio data and MIDI data.

When the compact discs are to be produced, the MIDI data on floppy diskette 17 is read by computer 19 and converted by interface board 21 into the necessary electrical signals needed to drive compact disc encoder 23. Interface board 21, as shown in FIG. 3, takes bytes of subcode data including MIDI information which have been loaded into RAM 41 from disk 17 and using serial to parallel shift register 45, loads buffer 47 with R, S, T, U and V subcode data. RAM 41 is loaded with the subcode data under program control (see Appendix 2) which reads disk 17, places the data on bus 42 for storage in RAM 41. The details concerning the foregoing components of board 21 are well within the skills of those skilled in the relevant art and, therefore will not be set forth herein. Similarly, encoder 23 is a standard compact disc mastering/pressing apparatus available from Phillips N.V., Sony Corporation, JVC and others which may need to be modified to accept the signals generated by interface board 21. The specific modifications which may be needed are dependent upon the particulars of the encoder and would be readily apparent to persons skilled in the art and therefore will not be described herein.

The details concerning the software used to convert MIDI data into a form which may be converted into signals for use by encoder 23 are as follows. Presently, the standard specification for MIDI is known as MIDI 1.0 and is published and distributed by International MIDI Association, 12439 Magnolia Boulevard, Suite 104 North Hollywood, Calif. 91607. According to the standard, MIDI data is sent and received at speeds up to 3125 bytes per second, with each byte having 8 bits of information. On the other hand, subcode packs which, as noted above, consist of 24 six bit words, are transmitted at 300 per packs per second. Although, each pack has 24 six bit words, as shown in FIG. 1a, only words 4-19 are used for data, for a total of 16 six byte words or 96 bits per pack. Thus, each pack can accommodate up to 12 eight bit MIDI bytes. However, at 300 packs per second, with 12 MIDI bytes per pack, there would be 3600 MIDI bytes per second which exceeds the MIDI specification of a maximum of 3125 bytes per second. Inasmuch as not all 12 bytes may be used, the scheme for placing the MIDI data into the subcode area must provide a mechanism for ensuring that 3125 bytes or less of MIDI data are transmitted per second.

One mechanism which may be employed is to limit the number of MIDI bytes to no more than 10 per pack. In this manner, even if 300 consecutive packs contained only MIDI data, only 3000 bytes of MIDI data could be transmitted per second. While such limitation would be adequate for most applications, there may be times when it is desired to use the maximum MIDI data rate of 3125 bytes per second. If no more than 11 MIDI bytes are allowed per pack, then the 3125 bytes per second standard can be met be limiting the number of packs which are allowed to have 11 MIDI bytes to no more than 5 out of 12 (i.e., for each 12 packs, there are 5*11+7*10=125 bytes and there are 25 groups of 12 packs every second or 125*25=3125 bytes per second). However, as a practical matter, 11 MIDI bytes per pack is not practical since sequences of MIDI commands rarely add up to 11 bytes. For example, the most common MIDI commands are NOTE ON and NOTE OFF which are 3 bytes each, four of which may be placed in a 12 byte pack. Alternatively, three such commands may be placed in a pack with one MIDI clock for a total of 10 bytes. In this manner, up to 12 bytes may be placed in each pack so long as no more than 125 bytes are placed in any 12 consecutive packs.

If 12 bytes are allowed in a pack, the actual number of bytes in a pack must be placed in word one of the pack which is known as the command word. Suitable 10, 11 and 12 bytes per pack schemes are shown in FIGS. 1b-1d respectively. The scheme shown in FIGS. 1c and 1d may also be used for less than 11 bytes by putting smaller numbers in the No. of MIDI bytes field, and using less of the data space. The scheme in FIG. 1b can be made compatible with the schemes shown in FIGS. 1c and 1d provided the command word contains a value greater than 12, thus flagging the scheme shown in 1b.

A suitable program in C source code for executing in computer 15 to convert MIDI data from MIDI source 11 to suitable subcode data is attached hereto as Appendix 1. The embodiment shown in Appendix 1 uses a 10 bytes of MIDI data per subcode pack encoding scheme as shown in FIG. 1b. Modifications to the routine SAVE-SUBCODE for encoding 1 and 12 MIDI bytes per subcode pack as shown in FIGS. 1c and 1d would be well within the abilities of a person having ordinary skill in the art. The purpose of the program is to place the MIDI data from MIDI source 11 into subcode pack by adding the necessary mode, item and command entries, and determining and adding the six parity words. A description of each of its routines is as follows. A hierarchy chart which describes which function calls which sub functions is shown in FIG. 4a-4h. In FIGS. 4a-4h, the references to MPU-401 is MIDI interface board 13 which as previously noted is based on Roland's MPU-401 technology.

MAIN

Main program which calls the major functions described below. (accepts default tune file name as a command line parameter if present)

PUT_MENU

Displays title, current tune and menu items:
"RECORD",
"RECORD WITH CLOCKS",
"PLAY",
"PLAY WITH CLOCKS",
"SAVE",
"LOAD",
"SELECT TUNE",
"SAVE SUBCODE DATA",
"LOAD SUBCODE DATA",
"QUIT", RECORD (int MIDI-sync)

Starts recording with optional MIDI clock synchronization (MIDI-sync=TRUE). Starts record when command MIDI-start is received from MIDI source 11. Displays time and records until Esc is hit, the command MIDI-stop is received or out of memory.

When finished, there is a table in memory which contains the MIDI events and the time each event was received. The time is recorded as the number of 1/300ths of a second after the time the initial MIDI event is received The recorded time relates directly to which subcode pack the MIDI event will eventually be put in (see SUBCODE$_{13}$SAVE).

PLAY (int send-clocks)

Starts playing with optional sending of MIDI clocks (sendclocks=TRUE). Prompts user to enter tempo if MIDI clocks are to be sent and tune was recorded without MIDI clocks. Starts playing when spacebar is hit, or when MIDI-start is received from MIDI source 11 (if MIDI clocks are being sent) (this allows MIDI source 11 to be played back simultaneously for verification).

Displays time and plays until Esc is hit, or MIDI-stop is received (if MIDI clocks sent).

SAVE_TUNE

Saves current MIDI data in current tune file (tune-name), in raw format. For each MIDI event (including clocks), eight bytes are saved as follows: four bytes for time (in 1/300s of a second from start of tune), one byte for MIDI status, one byte for first data byte (key number if note event), one byte for second data byte (key velocity if note event), and one byte to handle MIDI events which are longer than 3 bytes. When there are 3 bytes the flag is set to zero. If tune file name contains no extension, ".TUN" is appended.

Prompts user if a file with the same name already exists to prevent accidental overwrite.

LOAD_TUNE

Loads current MIDI data from current tune file (tune-name), in raw format. For each MIDI event in file, eight bytes are loaded as follows: four bytes for time (in 1/300s of a second from start of tune), one byte for MIDI status, one byte for first data byte (frequency number if note event), one byte for second data byte (key velocity if note event), and one byte that is set to zero for 3 byte commands. If tune file name contains no extension, ".TUN" is appended. Displays length of tune loaded and time offset of first event.

DISP_TIMES

Displays length of current tune and time offset of first event.

SELECT_TUNE

Allows user to change current tune file name (tune-name), displays new current tune.

MIDI_INTR

Called whenever interrupt is received from interface 13. Reads data from interface 13 and determines if it is a MIDI event to be recorded, a request for the next MIDI event to be played, or an interface 13 message, then calls appropriate routines or sets flags as is required.

PUT_PACK (long cur-pack, unsigned length)

Calculates parity symbols for current pack (pack) of given length (length), and stores these and the length in the current pack. Stores pack in subcode file at given pack location (cur-pack), returning FALSE if successful, TRUE otherwise.

REC_EVENT (char offset)

Receives MIDI event from interface 13 during record, and saves as MIDI data event, setting event time to current time, after adding timing byte received by MIDI-intr and passed to this routine (offset). If event is "data-end", sets "all-end" flag to indicate end of record. If recording with MIDI clocks (add-clocks=TRUE), inserts MIDI clocks at appropriate times between events received.

SEND_EVENT

Sends MIDI events to interface 13 during playback, adding timing byte determined by subtracting current time from event time. If the timing byte would be too large, sends timing overflow message to interface 13 instead. If end of playback data has been reached, sends "data end" message to interface 13. If playing back with MIDI clocks (adjusttempo=TRUE), adjusts event times so that they correspond to the desired playback tempo.

REC_MESSAGE

Receives MIDI system message from interface 13, setting "MIDI-stop" flag if message was "MIDI stop".

This indicates MIDI source 11 was stopped, and aborts play.

SEND_RESET

Resets interface 13, returning FALSE if reset successful, TRUE otherwise.

SEND_AND_REC (char command)

Sends data request command to interface 13, and returns interface 13 response. Sets "waiting-for-response" flag so that "MIDI-intr" will read response byte when it receives command acknowledge.

SEND_COM (char command)

Sends command to interface 13, returning FALSE if transmit successful, TRUE otherwise.

SEND_DATA (char data)

Sends data byte to interface 13, returning FALSE if transmit successful, TRUE otherwise.

REC_DATA

Receives data byte from interface 13, returning data byte if successful, 0 otherwise.

GETSTR (int length, int caps-only)

Displays current value of data input string (in-text) at current screen position, moves cursor to end of string, and allows user to edit string by using backspace and entering characters. String input is limited to "length", and any alpha input is converted to capitals if "caps-only" is TRUE. Returns TRUE if user exits editing with a return, FALSE if user exits with ESC.

GETYN

Waits for user to enter 'Y' (or 'y'), 'N' (or 'n') or ESC. Returns TRUE if user entered 'Y' (or 'y'), FALSE otherwise.

SAVE_SUBCODE

Saves current MIDI data into subcode data file. Prompts user with last entered subcode file name (or default at start), and allows it to be changed. Checks that subcode file exists, and that it is a multiple of ten packs (240) in length. Allows user to change/enter number of seconds and frames to start of audio, then checks that there is enough room in the subcode file to save all MIDI data with that lead in. This routine then "lines up" the first non-clock MIDI event with the position in the subcode file which is synchronous with start of audio. It then determines a position in the file synchronous to where the MIDI clock before the first non-clock MIDI event should occur. It writes a subcode pack containing a MIDI clock in this position and bases the positions of all the clocks and nonclock events that follow on this first placement. The routine stores data in the appropriate packs, clearing any packs intended for MIDI that are unused, until all packs of the remaining packs in the subcode file have been "passed". Displays error message if all MIDI data did not fit.

The exact location of any MIDI event in the subcode data file is determined by the time the event occurs. This time is recorded (see RECORD) in 1/300ths of a second. Three hundred sub code packs are transferred from a compact disc each second when the disc is playing. Therefore, the ideal location for a MIDI event is the pack which is the exact number of 1/300ths of a second into the subcode file. If this pack is not intended for MIDI—but, is reserved for graphics for example—the next pack useable for MIDI gets the event.

MIDI events are put in a single pack, they do not span packs. For example, the 3 bytes of a NOTE-ON event—a status byte, a frequency byte and a velocity byte—will always be in the same pack, the status will never be in one pack while the frequency and velocity are in the next available MIDI pack. This guarantees that musical instruments will receive the NOTE-ON event with no significant delay between bytes.

The bytes of MIDI data are formatted into subcode packs of 24 words where there are six bits in each word which is fully compatible with compact disc subcode graphics. The bit-for-bit manner of formatting the MIDI data is described in FIGS. 1b through 1d.

PUT_PACK (long cur-pack, unsigned length)

Calculates parity symbols for current pack (pack) of given length (length), and stores these and the length in the current pack. Stores pack in subcode file at given pack location (cur-pack), returning FALSE if successful, TRUE otherwise.

LOAD_SUBCOD

Loads current MIDI data from subcode data file. Prompts user with last entered subcode file name (or default at start), and allows it to be changed. Checks that subcode file exists, and that it is a multiple of ten packs (240) in length. It loads MIDI data from subcode file with the bandwidth desired, until all packs in the subcode file have been "passed". Loading is only used to check the distortion (if any) induced by subcode translation.

GET_PACK (long cur-pack)

Loads current pack (pack) from given subcode file pack position (cur-pack). Returns FALSE if successful, TRUE otherwise.

CALQPAR

Calculate q parity according to the Red Book.

CALPAR

Calculate non-q ("p") parity according to the Red Book.

A suitable program in C source code and Microsoft Macro Assembler for executing in computer 19 to move subcode data from a file on hard or floppy disk 17 to the computer's random access memory (RAM) is attached hereto as Appendix 2. The data in RAM is then accessed by encoder interface logic 21 by direct memory access (DMA) and presented to compact disc encoder 23 as parallel electronic signals. Encoder 23 uses these signals in conjunction with main channel audio data from another source to cut the master for a digital audio compact disc with subcode data.

Figure 5:
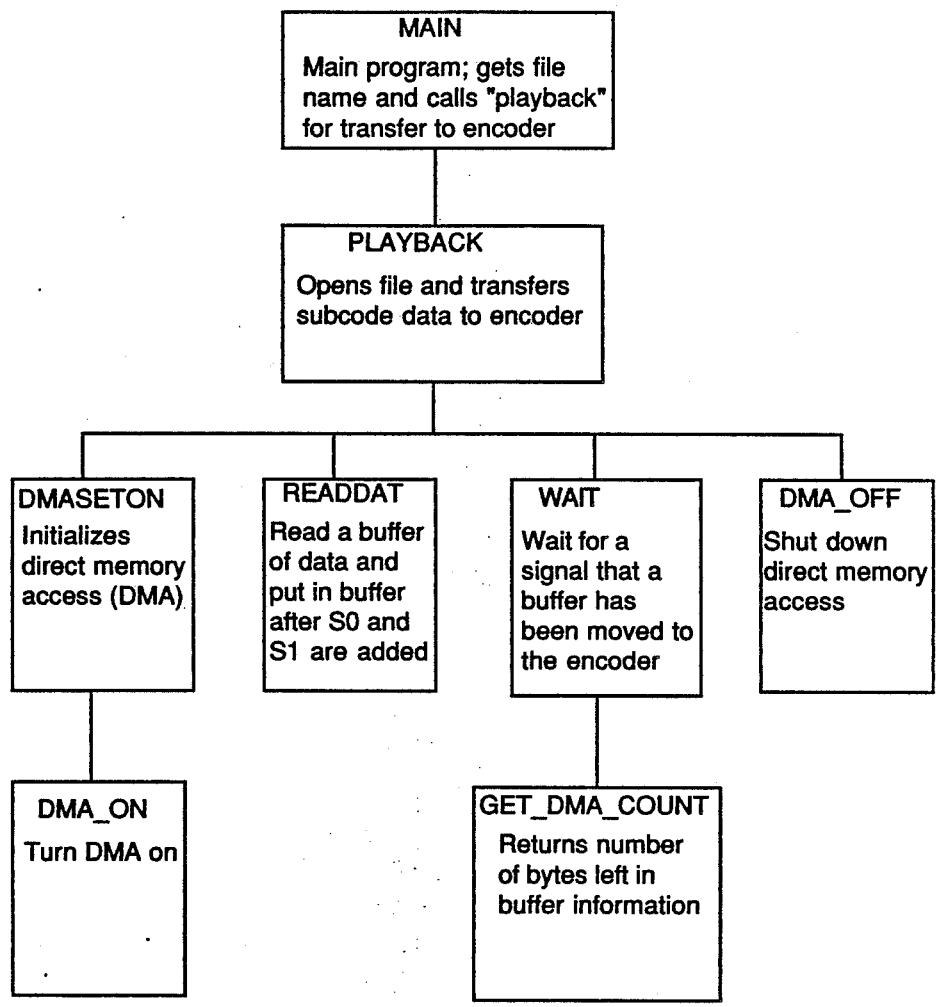
FIG. 5 is a hierarchical diagram of a computer program for reading subcode data stored on a floppy or hard disk to RAM for access by encoder interface logic 21.

A description of each of the routines of the program follows. A hierarchy chart which describes which function calls which sub-functions is shown in FIG. 5.

MAIN( )

Requests and receives the file name for the subcode data on hard or floppy disk 17. It passes this name to the "playback" routine which actually handles the data transfer. Upon return, "main" requests another file name and repeats the operation until stopped by a "control C" or "control break".

PLAYBACK (filename)

This routine opens the file of subcode data and returns if there is an error. If there is no error it invokes "dmaseton" which initializes encoder interface logic 21 to begin accessing and transferring data to encoder 23 when the board receives an electronic signal to do so. "Playback" then invokes "readdat" which reads data from the file, adds syncronization bytes according to the "Red Book" and moves the data to one of two data buffers in RAM. In the present embodiment of the program, each data buffer is 8134 bytes and is capable of holding 83 packets of subcode data. Another call to "readdat" is used to fill the second buffer, the "waitint" is called which waits for a signal from the encoder. When that signal is detected, "playback" calls "readdat" again to re-fill the first buffer and "waitint" to wait for a signal that the second buffer has been read and transferred. This process continues with data being read into one buffer while encoder interface logic 21 transfers data from the other buffer until all data from the file has been transferred. "Playback" invokes "dmaoff" to effectively shut down interface logic 21 activity, and closes the disk file containing subcode data and returns to "main".

READDAT (bufnum)

This routine is passed "bufnum" which indicates if the data should be transferred to the first or second buffer. "Readdat" begins by reading 83 packets worth of data from the subcode file on disk 17. Since the disk file does not contain sychronization bytes S0 and S1 (explained in the "red book"), there are only 96 bytes for each packet in the file. Thus, the program attempts to read $83 \times 96$ bytes=7968 bytes. If there is less than 7968 bytes left in the file, whatever data there is on the file is read in and binary zeros are added to the end of the data to pad it out to 7698 bytes. If the read attempt detects no data (as in the read after a partial read), the program returns to "playback" with a status of end-of-file.

The data read from the file is moved packet by packet—96 bytes at a time—to the buffer area indicated by "bufnum". Before each move to the buffer, an S0 byte and an S1 byte are added before the 96 bytes of data read making a move of 98 bytes to the buffer. In this manner, the buffer contains all the S0 and S1 data needed for the encoder.

DMASETON( )

Begins channel 1 DMA from 2C00:0 to 2C00:(83*98)d - wrap around mode. Calls "dma_on" to actually initialize initialize the DMA controller of computer 19 and set up the DMA channel.

DMA_ON( )

Sets up DMA channel 1 for 7.35 khz transfer of subcode bytes to encoder interface logic 21. The details for this may be found in the IBM PC Technical Reference Guide.

DMA_OFF( )

Stops DMA on channel 1 (subcode) by setting ch 1 mask bit.

WAIT_INT( )

Waits for a change in the bit 15 of the DMA controller's output count register accessed using routine "get_dma_count" (indicating a buffer boundary crossing—end of buffer)

GET_DMA_COUNT( )

Reads the contents of the remaining count register of DMA channel 1 and returns the count.

APPENDIX 1

```
/*
Three files comprise the source :
midiator.c
midisubc.c
midiglob.c
```

Compile midiator.c with :
tcc -c -ml -K -Ic:\turboc\include midiator.c

Compile midisubc.c with :
tcc -c -ml -K -Ic:\turboc\include midisubc.c

Link with :
tlink c:\turboc\lib\c0l.obj /x midiator midisubc,midiator,,
    c:\turboc\lib\emu c:\turboc\lib\math c:\turboc\lib\cl
(all on one line of course!)

or use clmidi.bat to compile and link either midiator or midisubc :
clmidi midiator
or
clmidi midisubc
*/ include "midiglob.c"

/************************************************************************* void main()

Main program accepts default tune file name as command line parameter.

*************************************************************************/
```
void main(int argc, char *argv[])
{
if (argc > 1)
  strcpy(tune_name,argv[1]);
else
  strcpy(tune_name,DEFAULT_TUNE_NAME);

strcpy(subc_name,DEFAULT_SUBC_NAME);
strcat(subc_name,".");
strcat(subc_name,SUBC_EXT);

percent = DEFAULT_PERCENT;

start_second = 10;
start_frame = 0;

textcolor(NORMAL_COLOR);
textbackground(NORMAL_BACK);
clrscr();

start_event = (event huge *) farcalloc((unsigned long) MAX_EVENT,sizeof(event));
end_event = start_event;

if (start_event == (event huge *) NULL)
{
  printf("%ld bytes of free memory required, only %lu available\n",(unsigned long) MAX_EVENT*sizeof(event),farcoreleft());
  exit(1);
}
```

```c
waiting_for_resp = FALSE;
add_clocks = FALSE;
adjust_tempo = FALSE;
send_reset();
setvect(8+IRQ_NO,midi_intr);
outportb(0x21,(inportb(0x21) & ~(1 << IRQ_NO)));
send_com(MEASURE_END_OFF_CMD);
send_com(MIDI_THRU_OFF_CMD);
send_com(REAL_TIME_ON_CMD);
send_com(AFFECTATION_OFF_CMD);
/*

Ignore pitch wheel and continuous controller information for now!

send_com(BENDER_ON_CMD);

*/
quit = FALSE;
not_saved = FALSE;
cur_opt = 0;
put_menu();
do
{
 gotoxy(MENU_COL+strlen(menu_text[cur_opt]),MENU_LINE + (cur_opt << 1));
 ch = bioskey(0);
 if ((ch & 0x00ff) == 0)
 {
  gotoxy(1,ERR_LINE);
  clreol();
  switch ((ch & 0xff00) >> 8)
  {
   case UP :
    if (cur_opt > 0)
     cur_opt--;
    else
     cur_opt = MENU_OPT-1;
    put_menu();
    break;
   case DOWN :
    if (cur_opt < MENU_OPT-1)
     cur_opt++;
    else
     cur_opt = 0;
    put_menu();
    break;
  }
 } else
  if ((ch & 0x00ff) == ENTER)
  {
   gotoxy(1,ERR_LINE);
   clreol();
    switch (cur_opt)
    {
```

```
      case 0 :
        record(FALSE);
        break;
      case 1 :
        record(TRUE);
        break;
      case 2 :
        play(FALSE);
        break;
      case 3 :
        play(TRUE);
        break;
      case 4 :
        save_tune();
        break;
      case 5 :
        load_tune();
        break;
      case 6 :
        select_tune();
        break;
      case 7 :
        save_subcode();
        gotoxy(1,STATUS_LINE);
        clreol();
        break;
      case 8 :
        load_subcode();
        disp_times();
        break;
      case 9 :
        if (not_saved)
      {
        gotoxy(1,STATUS_LINE);
          cputs("Tune not saved since last record, quit anyway (Y/N)?");
        if (!getyn())
      {
        gotoxy(1,STATUS_LINE);
        clreol();
        break;
      }
      }
      quit = TRUE;
        break;
    }
  }
} while (!quit);

send_reset();
farfree((void far *) start_event);
clrscr();
}
```

```
/*********************************************************************** void put_menu()

Displays title, current tune and menu items.

***********************************************************************/
void put_menu()
{
int opt;

gotoxy(25,1);
textcolor(TITLE_COLOR);
textbackground(TITLE_BACK);
cputs("MIDI TO SUBCODE DATA CONVERSION");
textcolor(HIGHLIGHT_COLOR);
textbackground(HIGHLIGHT_BACK);
gotoxy(28,2);
cputs("CURRENT TUNE IS ");
cputs(tune_name);
textcolor(NORMAL_COLOR);
textbackground(NORMAL_BACK);
clreol();
for (opt = 0; opt < MENU_OPT; opt++)
{
 gotoxy(MENU_COL,MENU_LINE + (opt << 1));
 if (opt == cur_opt)
 {
  textcolor(SELECT_COLOR);
   textbackground(SELECT_BACK);
 }
  cputs(menu_text[opt]);
 textcolor(NORMAL_COLOR);
  textbackground(NORMAL_BACK);
}
gotoxy(MENU_COL+strlen(menu_text[cur_opt]),MENU_LINE + (cur_opt << 1));
}

/*********************************************************************** void record(int midi_sync)

Starts recording with optional midi clock syncronization
        (midi_sync == TRUE).  Starts record when midi start is received
        from sequencer.  Displays time and records until Esc is hit,
        midi stop is received or out of memory.

***********************************************************************/
void record(int midi_sync)
{
unsigned int tempo_count,last_clock;
int auto_detect;
long tempo_total;
float tempo_flt;
```

```c
cur_event = start_event;
num_event = 0;
run_stat = 0;
midi_time = 0;
next_clock = 0;
tempo_total = 0;
tempo_count = 0;
all_end = FALSE;
if (midi_sync)
{
 in_text[0] = '\0';
 do
 {
  gotoxy(1,STATUS_LINE);
   cputs("Enter tempo, or return for autodetection : ");
   getstr(6,TRUE);
   if (in_text[0] == '\0')
  {
   auto_detect = TRUE;
    break;
  }
   else
  {
   auto_detect = FALSE;
    tempo_flt = atof(in_text);
  }
  gotoxy(1,ERR_LINE);
  clreol();
  if (tempo_flt < MIN_TEMPO || tempo_flt > MAX_TEMPO)
    cprintf("Tempo must be in range %d - %d",MIN_TEMPO,MAX_TEMPO);
   else
    break;
 } while (TRUE);
 send_com(MIDI_CLK_CMD);
 add_clocks = TRUE;
}
else
{
 auto_detect = FALSE;
 tempo_flt = SYNC_TEMPO;
 send_com(INT_CLK_CMD);
 send_com(SET_TEMPO_CMD);
 send_data(SYNC_TEMPO);
}
send_com(CLOCK_ON_CMD);
send_com(SET_ACTIVE_TRACKS_CMD);
send_data(0x00);
send_com(AFFECTATION_ON_CMD);
send_com(START_REC_CMD);
gotoxy(1,STATUS_LINE);
clreol();
cputs("Start sequencer, or hit Esc to abort");
while (midi_time == 0 && !all_end)
{
 if (bioskey(1))
  if ((char) bioskey(0) == ESC)
```

```c
    break;
}
clock = 0;
last_clock = 0;
if (midi_time != 0)
{
 gotoxy(CLOCK_COL1,CLOCK_LINE1);
 clreol();
 gotoxy(1,STATUS_LINE);
 clreol();
 cputs("Recording, stop sequencer or hit Esc to abort");
 not_saved = TRUE;
 while (!all_end)
{
  if (bioskey(1))
    if ((char) bioskey(0) == ESC) break;
  if (clock != last_clock)
  {
   if (num_event == MAX_EVENT)
   {
    gotoxy(1,ERR_LINE);
     cputs("Out of memory during record");
     break;
   }
    if (auto_detect)
    {
    if (clock == 1)
    {
      tempo = send_and_rec(GET_TEMPO_CMD);
      tempo_total += tempo;
      tempo_flt = tempo;
    }
     else
      tempo_total += send_and_rec(GET_TEMPO_CMD);
     tempo_count++;
   }
    last_clock = clock;
   gotoxy(CLOCK_COL1,CLOCK_LINE1);
    cprintf("Time =%2d:%02d",(int)((clock >> 1) / tempo_flt),((int) (((clock >> 1) * 60) / tempo_flt)) % 60);
  }
 }
}
send_com(STOP_REC_CMD | WITH_MIDI_STOP);
send_com(AFFECTATION_OFF_CMD);
send_com(CLOCK_OFF_CMD);

gotoxy(1,STATUS_LINE);
clreol();
end_event = cur_event;
add_clocks = FALSE;
if (midi_sync)
{
  if (auto_detect)
   if (tempo_count == 0)
    tempo_flt = SYNC_TEMPO;
   else
```

```
    tempo_flt = (tempo_total + (tempo_count >> 1)) / tempo_count;
  gotoxy(1,STATUS_LINE);
  clreol();
  cprintf("Adjusting tempo to %3.2f",tempo_flt);
  for (cur_event = start_event; cur_event < end_event; cur_event++)
    cur_event->time = (cur_event->time * SYNC_TEMPO) / tempo_flt;
  }
gotoxy(1,STATUS_LINE);
clreol();
disp_times();
}

/***************************************************************** void play(int send_clocks)

Starts playing with optional sending of midi clocks
        (send_clocks == TRUE).  Prompts user to enter tempo if
        midi clocks are to be sent and tune was recorded without
        midi clocks.  Starts playing when spacebar is hit, or
        when midi start is received from sequencer (if midi clocks
        are being sent)    (this allows sequencer to be played back
        simultaneously for verification).  Displays time and plays
        until Esc is hit, or midi stop is received (if midi clocks sent).

*****************************************************************/
void play(int send_clocks)
{
long  tot_clocks,tot_packs,long_value;

if (end_event == start_event)
{
 gotoxy(1,ERR_LINE);
 clreol();
 cputs("Nothing to play");
 return;
}
if (send_clocks)
{
 tot_clocks = 0;
 for (cur_event = start_event; cur_event < end_event; cur_event++)
   if (cur_event->status == MIDI_CLOCK)
 {
   tot_clocks++;
    tot_packs = cur_event->time;
 }
if (tot_packs == 0 || tot_clocks == 0)
{
  in_text[0] = '\0';
  do
  {
   gotoxy(1,STATUS_LINE);
    cputs("Recorded without clocks, enter tempo : ");
   getstr(3,TRUE);
    tempo = atoi(in_text);
   gotoxy(1,ERR_LINE);
```

```c
      clreol();
      if (tempo < MIN_TEMPO || tempo > MAX_TEMPO)
        cprintf("Tempo must be in range %d - %d",MIN_TEMPO,MAX_TEMPO);
      else
        break;
    } while (TRUE);
  }
   else
   {
    long_value = ((tot_clocks + 12L) / 24L) * PACKS_PER_MINUTE;
    tempo = (long_value + (tot_packs >> 1)) / tot_packs;
   }
   adjust_tempo = TRUE;
  }
  else
   tempo = SYNC_TEMPO;
  cur_event = start_event;
  run_stat = 0;
  midi_time = 0;
  all_end = FALSE;
  midi_stop = FALSE;
  send_com(INT_CLK_CMD);
  send_com(SET_TEMPO_CMD);
  send_data(tempo);
  send_com(CLOCK_ON_CMD);
  send_com(SET_ACTIVE_TRACKS_CMD);
  send_data(0x01);
  send_com(CLEAR_COUNTERS_CMD);
  send_com(AFFECTATION_ON_CMD);
  gotoxy(1,STATUS_LINE);
  clreol();
  if (send_clocks)
    cputs("Hit space bar to start, Esc to abort");
  else
    cputs("Start sequencer or hit space bar to start, Esc to abort");
  do
  {
   if (bioskey(1))
   {
    if (((ch = bioskey(0)) & 0x00ff) == ESC)
      break;
    if ((ch & 0x00ff) == ' ')
    {
     send_com(AFFECTATION_OFF_CMD);
     send_com(START_PLAY_CMD | WITH_MIDI_START);
    }
   }
  } while (midi_time == 0 && !all_end);
  clock = 0;
  if (midi_time != 0)
  {
   gotoxy(1,STATUS_LINE);
   clreol();
   if (send_clocks)
     cputs("Playing, hit Esc to abort");
```

```
      else
        cputs("Playing, stop sequencer or hit Esc to abort");
      while (!all_end && !midi_stop)
    {
      if (bioskey(1))
        if ((char) bioskey(0) == ESC) break;
      gotoxy(CLOCK_COL1,CLOCK_LINE2);
        cprintf("Time =%2d:%02d",(int)((clock >> 1) / tempo),(int)((((clock >> 1) * 60) / tempo))
          % 60);
    }
    }
    send_com(STOP_PLAY_CMD | WITH_MIDI_STOP);
    send_com(AFFECTATION_OFF_CMD);
    send_com(CLOCK_OFF_CMD);
    adjust_tempo = FALSE;
    gotoxy(CLOCK_COL1,CLOCK_LINE2);
    clreol();
    gotoxy(1,STATUS_LINE);
    clreol();
    }

/************************************************************************** void  save_tune()

Saves current midi data in current tune file (tune_name), in
            raw format.  For each midi event (including clocks), eight bytes
            are saved, four bytes (long) for time (in 1/300s of a second from
            start of tune), one byte for midi status, one byte for first data
            byte (key number if note event), one byte for second data byte
            (key velocity if note event), and one byte that is currently unused
            (set to zero).  If tune file name contains no extension, ".TUN " is
            appended.  Prompts user if file already exists, to allow overwrite
            to be avoided.

**************************************************************************/
void  save_tune()
{
char  file_name[80];

if (end_event == start_event)
{
 gotoxy(1,ERR_LINE);
 clreol();
 cputs("Nothing to save");
 return;
}
strcpy(file_name,tune_name);
if (strchr(file_name,'.') == NULL)
{
 strcat(file_name,".");
 strcat(file_name,TUNE_EXT);
}
if ((midi_file = open(file_name,O_RDONLY)) != -1)
```

```c
{
  close(midi_file);
  gotoxy(1,STATUS_LINE);
  cprintf("%s already exists, overwrite (Y/N)?",file_name);
  if (!getyn())
  {
    gotoxy(1,STATUS_LINE);
    clreol();
    return;
  }
}
if ((midi_file = open(file_name,O_WRONLY | O_TRUNC | O_CREAT | O_BINARY,S_IREAD | S_IWRITE)) == -1)
{
 gotoxy(1,ERR_LINE);
 clreol();
 cprintf("Error opening file %s",file_name);
}
else
{
 gotoxy(1,STATUS_LINE);
 clreol();
 cprintf("Saving %s",file_name);
 not_saved = FALSE;
 for (cur_event = start_event; cur_event < end_event; cur_event++)
   if (write(midi_file,(void *) cur_event,8) == -1)
   {
     gotoxy(1,ERR_LINE);
     clreol();
     cprintf("Error writing to file %s",file_name);
     cur_event = end_event;
   }
 close(midi_file);
 gotoxy(1,STATUS_LINE);
 clreol();
}
}

/********************************************************************* void load_tune()

Loads current midi data from current tune file (tune_name), in
        raw format. For each midi event in file, eight bytes
        are loaded, four bytes (long) for time (in 1/300s of a second from
        start of tune), one byte for midi status, one byte for first data
        byte (key number if note event), one byte for second data byte
        (key velocity if note event), and one byte that is currently unused
        (set to zero). If tune file name contains no extension, ".TUN " is
        appended. Displays length of tune loaded and SMPTE offset of first
        event.

*********************************************************************/
void load_tune()
{
char file_name[80];
```

```c
strcpy(file_name,tune_name);
if (strchr(file_name,'.') == NULL)
{
 strcat(file_name,".");
 strcat(file_name,TUNE_EXT);
}
if ((midi_file = open(file_name,O_RDONLY | O_BINARY)) == -1)
{
 gotoxy(1,ERR_LINE);
 clreol();
 cprintf("Error opening file %s",file_name);
}
else
{
 gotoxy(1,STATUS_LINE);
 cprintf("Loading %s",file_name);
 not_saved = FALSE;
 cur_event = start_event;
 while (read(midi_file,(void *) cur_event,8) != 0)
 {
  cur_event++;
 }
 close(midi_file);
 end_event = cur_event;
 disp_times();
}
}

/*********************************************************************** void disp_times()

Displays length of current tune and SMPTE offset of first
    event.

***********************************************************************/
void disp_times()
{
long load_time;
if (end_event == start_event)
 load_time = 0;
else
{
 cur_event = end_event;
 cur_event--;
 load_time = cur_event->time;
}
gotoxy(CLOCK_COL1,CLOCK_LINE1);
cprintf("Time =%2d:%02d",(int) (load_time / ((SYNC_TEMPO << 1) * 60)),
            (int) ((load_time / (SYNC_TEMPO << 1)) % 60));
for (cur_event = start_event; cur_event != end_event; cur_event++)
 if (cur_event->status != MIDI_CLOCK) break;
gotoxy(CLOCK_COL2,CLOCK_LINE1);
if (cur_event == end_event)
 cputs("No events           ");
else
```

```
cprintf("1st event =%2d:%02d:%02d",
    (int) (cur_event->time / ((SYNC_TEMPO << 1) * 60)),
    (int) ((cur_event->time / (SYNC_TEMPO << 1)) % 60),
    (int) ((cur_event->time / ((SYNC_TEMPO << 1) / 30)) % 30));
gotoxy(1,STATUS_LINE);
clreol();
}
```

```
/*********************************************************************** void select_tune()

Allows user to change current tune filename (tune_name), displays
        new current tune.

***********************************************************************/
void select_tune()
{
gotoxy(1,STATUS_LINE);
cputs("Enter tune name, or Esc to abort : ");
strcpy(in_text,tune_name);
if (getstr(0,TRUE))
  strcpy(tune_name,in_text);
gotoxy(1,STATUS_LINE);
clreol();
textcolor(HIGHLIGHT_COLOR);
textbackground(HIGHLIGHT_BACK);
gotoxy(28,2);
cputs("CURRENT TUNE IS ");
cputs(tune_name);
textcolor(NORMAL_COLOR);
textbackground(NORMAL_BACK);
clreol();
}
```

```
/*********************************************************************** void interrupt midi_intr()

Called whenever interrupt is received from MPU-401. Reads data
        from MPU-401 and determines if it is a midi event to be recorded,
        a request for the next midi event to be played, or an MPU message,
        then calls appropriate routines or sets flags as is required.

***********************************************************************/
void interrupt midi_intr()
{
char response;

response = inportb(DATA_PORT);
if (response < 0xf0)
  rec_event(response);
else
  switch(response)
  {
```

```
    case SEND_DATA_RESP :
      send_event();
      break;
    case OVRFLW_RESP :
      midi_time += OVRFLW_CLKS;
      break;
    case END_RESP :
      all_end = TRUE;
      break;
    case CLK_RESP :
      clock++;
      break;
    case ACK_RESP :
      cmd_ack = TRUE;
      if (waiting_for_resp)
      {
        resp_data = rec_data();
        waiting_for_resp = FALSE;
      }
      break;
    case MESSAGE_RESP :
      rec_message();
  }
  outportb(0x20,0x20);
}
```

```
/******************************************************************* void   rec_event(char   offset)

Receives midi event from MPU-401 during record, and saves as midi
    data event, setting event time to current time, after adding timing
    byte received by "midi_intr" and passed to this routine (offset).
    If event is "data_end", sets "all_end" flag to indicate end of record.
    If recording with midi clocks (add_clocks == TRUE), inserts clocks
    at appropriate times between events received.

Note : Remember that MPU-401 will not send midi clocks to host,
           but will adjust note timing to match tempo of received
           midi clocks.

*******************************************************************/
void  rec_event(char  offset)
{
char  response;

midi_time += offset;
if (add_clocks)
{
  while (next_clock <= midi_time)
  {
    cur_event->time = next_clock;
    cur_event->status = MIDI_CLOCK;
    cur_event->first_byte = 0;
    cur_event->second_byte = 0;
    if (num_event < MAX_EVENT)
    {
```

```
      cur_event++;
      num_event++;
    }
    next_clock += INT_TO_MIDI_CLKS;
   }
  }
  response = rec_data();
  if (response < 0xf0)
  {
   cur_event->time = midi_time;
   if (response >= 0x80)
   {
     run_stat = response;
     response = rec_data();
   }
   cur_event->status = run_stat;
   cur_event->first_byte = response;
   if (run_stat < 0xc0 || run_stat >= 0xe0)
     cur_event->second_byte = rec_data();
   else
     cur_event->second_byte = 0;
   if (num_event < MAX_EVENT)
   {
     cur_event++;
     num_event++;
   }
  }
  else
   if (response == END_RESP)
    all_end = TRUE;
 }
/****************************************************************** void  send_event()

Sends midi events to MPU-401 during playback, adding timing byte
        determined by subtracting current time from event time. If the
        timing byte would be to large, sends timing overflow message to
        MPU-401 instead. If end of playback data has been reached, sends
        "data end" message to MPU-401. If playing back with midi clocks
        (adjust_tempo), adjusts event times so that they correspond to
        the desired playback tempo.

Note : Remember that MPU-401 will not receive midi clocks from
               host, but generates them automatically for the current tempo.

*******************************************************************/
void  send_event()
{
char response;
long clks_to_next;

if (cur_event < end_event)
{
 while (cur_event->status == MIDI_CLOCK)
   cur_event++;
 if (adjust_tempo)
```

```
  clks_to_next = ((cur_event->time * tempo) / SYNC_TEMPO) - midi_time;
else
  clks_to_next = cur_event->time - midi_time;
if (clks_to_next < OVRFLW_CLKS)
{
  midi_time += clks_to_next;
  response = clks_to_next;
   send_data(response);
   if (cur_event->status != run_stat)
  {
    run_stat = cur_event->status;
     send_data(cur_event->status);
  }
    send_data(cur_event->first_byte);
   if (run_stat < 0xc0 || run_stat >= 0xe0)
     send_data(cur_event->second_byte);
  cur_event++;
}
 else
{
 midi_time += OVRFLW_CLKS;
  send_data(OVRFLW_RESP);
}
}
else
{
 send_data(0);
 send_data(END_RESP);
}
}
```

/********************************************************************* void  rec_message()

Receives midi system message from MPU-401, setting "midi_stop" flag
        if message was "midi stop". This indicates sequencer was stopped,
        and aborts play.

*********************************************************************/
```
void rec_message()
{
char response;

response = rec_data();
if (response == MIDI_STOP)
 midi_stop = TRUE;
}
```

/********************************************************************* int  send_reset()

Resets MPU-401, returning FALSE if reset successfull, TRUE otherwise.

*********************************************************************/
```
int send_reset()
```

```c
{
long timeout;

outportb(0x21,(inportb(0x21) | (1 << IRQ_NO)));
outportb(CMD_PORT,RESET_CMD);
do
{
 timeout = 0L;
 while ((inportb(CMD_PORT) & 0x80) && timeout < TOO_LONG) timeout ++;
}
while (inportb(DATA_PORT) != ACK_RESP && timeout < TOO_LONG);
if (timeout == TOO_LONG)
{
 gotoxy(1,ERR_LINE);
 clreol();
 cputs("MPU-401 will not reset");
 return(TRUE);
}
return(FALSE);
}
```

```
/**************************************************************** char send_and_rec(char command)
        Sends data request command to MPU-401, and returns MPU-401 response.
        Sets "waiting_for_response" flag so that "midi_intr" will read response
        byte when it receives command acknowledge.

****************************************************************/
```

```c
char send_and_rec(char command)
{
long timeout;

waiting_for_resp = TRUE;
send_com(command);
waiting_for_resp = FALSE;
return(resp_data);
}
```

```
/**************************************************************** int send_com(char command)

Sends command to MPU-401, returning FALSE if transmit successfull,
        TRUE otherwise.

****************************************************************/
```

```c
int send_com(char command)
{
long timeout;

timeout = 0L;
while ((inportb(CMD_PORT) & 0x40) && timeout < TOO_LONG) timeout ++;
if (timeout == TOO_LONG)
{
```

```
  gotoxy(1,ERR_LINE);
  clreol();
  cputs("MPU not ready to receive command");
  return(TRUE);
 }
 cmd_ack = FALSE;
 outportb(CMD_PORT,command);
 timeout = 0L;
 while (!cmd_ack && timeout < TOO_LONG) timeout ++;
 if (!cmd_ack)
 {
  gotoxy(1,ERR_LINE);
  clreol();
  cprintf("Command %2x not acknowledged",command);
  return(TRUE);
 }
 return(FALSE);
}

/******************************************************************* int send_data(char data)
        Sends data byte to MPU-401, returning FALSE if transmit successfull,
        TRUE otherwise.

*******************************************************************/
int send_data(char data)
{
 long timeout;

timeout = 0L;
 while ((inportb(CMD_PORT) & 0x40) && timeout < TOO_LONG) timeout ++;
 if (timeout == TOO_LONG)
 {
  gotoxy(1,ERR_LINE);
  clreol();
  cprintf("Data %2x cannot be sent",data);
  return(TRUE);
 }
 outportb(DATA_PORT,data);
 return(FALSE);
}

/******************************************************************* char rec_data()

Receives data byte from MPU-401, returning data byte if successfull,
        0 otherwise.

*******************************************************************/
char rec_data()
{
 long timeout;

timeout = 0L;
 while ((inportb(CMD_PORT) & 0x80) && timeout < TOO_LONG) timeout ++;
```

```c
if (timeout == TOO_LONG)
{
 gotoxy(1,ERR_LINE);
 clreol();
 cputs("Expected data not recieved");
 return(0);
}
return(inportb(DATA_PORT));
}

/********************************************************************** int getstr(int length,int caps_only)

Displays current value of data input string (in_text) at current
        screen position, moves cursor to end of string, and allows user
        to edit string by using backspace and entering characters. String
        input is limited to "length", and any alpha input is converted to
        capitals if "caps_only" is TRUE. Returns TRUE if user exits editing
        with CR, FALSE if user exits with ESC.

**********************************************************************/
int getstr(int length,int caps_only)
{
int  start_x,start_y,str_pos;

textcolor(INPUT_COLOR);
textbackground(INPUT_BACK);
start_x = wherex();
start_y = wherey();
cputs(in_text);
str_pos = strlen(in_text);
gotoxy(start_x + str_pos,start_y);
do
{
 ch = bioskey(0);
 if ((ch & 0x00ff) != 0)
 {
  ch &= 0x00ff;
  if (isalnum(ch) || ch == '.' || ch == ':' || ch == '\\')
  {
    if (start_x + str_pos < 80 && (str_pos < length || length == 0))
    {
     if (caps_only)
      ch = toupper(ch);
     in_text[str_pos] = ch;
    str_pos++;
     putch(ch);
   }
  }
  else
  if (ch == BACKSPACE && str_pos > 0)
  {
    str_pos--;
     gotoxy(start_x + str_pos,start_y);
    putch(' ');
  }
```

```c
      else
      if (ch == ESC)
      {
         in_text[str_pos] = '\0';
         textcolor(NORMAL_COLOR);
         textbackground(NORMAL_BACK);
         return(FALSE);
      }
   }
   gotoxy(start_x + str_pos,start_y);
} while (ch != ENTER);
in_text[str_pos] = '\0';
textcolor(NORMAL_COLOR);
textbackground(NORMAL_BACK);
return(TRUE);
}

/**************************************************************** int getyn()

Waits for user to enter 'Y' (or 'y'), 'N' (or 'n') or ESC.
         Returns TRUE if user entered 'Y' (or 'y'), FALSE otherwise.

****************************************************************/
int getyn()
{
do
{
 ch = bioskey(0) & 0x00ff;
 if (toupper(ch) == 'Y')
   return(TRUE);
 if (ch == ESC)
    break;
} while (toupper(ch) != 'N');
return(FALSE);
} include <stdlib.h>
include <ctype.h>
#include <conio.h>
#include <fcntl.h>
#include <io.h>
#include <stat.h>
#include <dos.h>
#include <bios.h>
#include <alloc.h>
include <float.h> define TRUE -1
define FALSE 0 define ESC 0x1b
define BACKSPACE 0x08
#define ENTER 0x0d
```

```c
#define UP 72
#define DOWN 80

/* maximum input string length */
#define IN_STR_LEN 80

/* maximum number of midi events */
#define MAX_EVENT 65000

/* default filenames and extensions */
#define DEFAULT_TUNE_NAME "MIDIDATA"
#define DEFAULT_SUBC_NAME "SUBCODE"

#define TUNE_EXT "TUN"
#define SUBC_EXT "BIN"

/* default subcode bandwidth */
#define DEFAULT_PERCENT 50

/* subcode packs per minute */
/* 300 packs per second * 60 seconds = 18000 packs per minute */
define PACKS_PER_MINUTE 18000L /* bytes per subcode pack */
define BYTES_PER_PACK 24L /* desired subcode resolution in packs per second / 2 */
/* when tempo is set to this value, we have one clock per pack */
/* 18000 packs per minute / 120 clocks per beat = 150 beats per minute */
#define SYNC_TEMPO 150

/* minimum and maximum tempos allowed by MPU-401 */
#define MIN_TEMPO 8
#define MAX_TEMPO 240

/* midi clocks per beat */
#define MIDI_CLKS_TO_BEAT 24L

/* internal clocks per midi clock */
/* 120 internal clocks per beat / 24 midi clocks per beat */
#define INT_TO_MIDI_CLKS 5

/* number of clocks represented by overflow message */
#define OVRFLW_CLKS 240

/* MIDI real time messages */
#define MIDI_CLOCK 0xf8
#define MIDI_STOP 0xfc

/* MPU-401 response codes */
#define SEND_DATA_RESP 0xf0
#define OVRFLW_RESP 0xf8
#define END_RESP 0xfc
#define CLK_RESP 0xfd
#define ACK_RESP 0xfe
#define MESSAGE_RESP 0xff
```

```c
/* MPU-401 commands */
#define STOP_PLAY_CMD 0x04
#define START_PLAY_CMD 0x08
#define STOP_REC_CMD 0x10
#define START_REC_CMD 0x20
#define REAL_TIME_ON_CMD 0x39
#define INT_CLK_CMD 0x80
#define MIDI_CLK_CMD 0x82
#define METRO_OFF_CMD 0x84
#define METRO_ON_CMD 0x85
#define BENDER_ON_CMD 0x87
#define MIDI_THRU_OFF_CMD 0x88
#define MEASURE_END_OFF_CMD 0x8c
#define AFFECTATION_OFF_CMD 0x90
#define AFFECTATION_ON_CMD 0x91
#define CLOCK_OFF_CMD 0x94
#define CLOCK_ON_CMD 0x95
#define GET_TEMPO_CMD 0xaf
#define CLEAR_COUNTERS_CMD 0xb8
#define SET_TEMPO_CMD 0xe0
#define SET_CLK_TO_HOST_RATE_CMD 0xe7
#define SET_ACTIVE_TRACKS_CMD 0xec
define RESET_CMD 0xff /* MPU-401 play/record command extensions */
define WITH_MIDI_STOP 0x01
#define WITH_MIDI_START 0x02

/* MPU-401 hardware defines */
#define DATA_PORT 0x330
#define CMD_PORT 0x331
#define IRQ_NO 2

/* MPU-401 timeout value */
#define TOO_LONG 30000L

/* number of menu options */
#define MENU_OPT 10

/* colors */
#define NORMAL_COLOR LIGHTGRAY
#define NORMAL_BACK BLACK
#define TITLE_COLOR LIGHTBLUE
#define TITLE_BACK BLACK
#define SELECT_COLOR LIGHTGRAY
#define SELECT_BACK BLUE
#define HIGHLIGHT_COLOR YELLOW
#define HIGHLIGHT_BACK BLACK
#define INPUT_COLOR YELLOW
define INPUT_BACK BLUE /* screen positions */
define MENU_LINE 4
#define MENU_COL 30
#define STATUS_LINE 24
#define CLOCK_LINE1 4
#define CLOCK_LINE2 8
```

```c
#define CLOCK_COL1 49
#define CLOCK_COL2 62
#define ERR_LINE 25

/* shorthand for exclusive oring */
#define uxor(a,b)   ( (a) ^ (b) )
typedef struct {
            long time;
            char status;
            char first_byte;
            char second_byte;
            char flag;
        } event;

ifndef COMMONX char *menu_text[MENU_OPT] = {
"RECORD",
"RECORD WITH CLOCKS",
"PLAY",
"PLAY WITH CLOCKS",
"SAVE",
"LOAD",
"SELECT TUNE",
"SAVE SUBCODE DATA",
"LOAD SUBCODE DATA",
"QUIT"};
define COMMONX else

COMMONX char *menu_text[MENU_OPT];

#endif

COMMONX unsigned int ch;
COMMONX int midi_file,subc_file;
COMMONX int
cmd_ack,all_end,midi_stop,waiting_for_resp,add_clocks,adjust_tempo;
COMMONX int quit,not_saved;
COMMONX int cur_opt;
COMMONX int percent;
COMMONX long clock;
COMMONX unsigned int num_event;
COMMONX unsigned int tempo;
COMMONX char run_stat,resp_data;
COMMONX long midi_time,next_clock;
COMMONX int start_second,start_frame;
COMMONX event huge *start_event;
COMMONX event huge *cur_event;
COMMONX event huge *end_event;
COMMONX char tune_name[80];
COMMONX char subc_name[80];
COMMONX char in_text[IN_STR_LEN+1];

COMMONX unsigned antilog[64];
```

```
COMMONX unsigned mul6[64];
COMMONX unsigned mul21[64];
COMMONX unsigned mul39[64];
COMMONX unsigned mul18[64];
COMMONX unsigned mul1[64];
COMMONX int log[64];

COMMONX char pack[24];

void    put_menu();
void    record(int);
void    play(int);
void    save_tune();
void    load_tune();
void    disp_times();
void    select_tune();
void    interrupt midi_intr();
void    rec_event(char);
void    send_event();
void    rec_message();
int     send_reset();
char    send_and_rec(char);
int     send_com(char);
int     send_data(char);
char    rec_data();
int     getstr(int,int);
int     getyn();
void    save_subcode();
int     put_pack(long,unsigned);
void    calqpar();
void    calpar();
unsigned  mult1(), mult();
void    load_subcode();
int     getpack(long);

#define COMMONX extern
#include "midiglob.c"

/********************************************************************* void  save_subcode()

Saves current midi data into subcode data file.  Prompts user with
    last entered subcode file name (or default at start), and allows
    it to be changed.  Checks that subcode file exists, and that it is
 ---    a multiple of ten packs (240) in length.  Allows user to change/enter
    number of seconds and frames to start of audio, then checks that there
    is enough room in the subcode file to save all midi data with that
    lead in (this is only a ballpark gues at this point, since a low
    bandwidth could stretch out midi data).  Allows user to change/enter
    bandwidth (10%,50%,90%,100%), then "lines up" the first non-clock
    midi event with the position in the subcode file of the time to start
    of audio.  It then "moves back" to the position  of the previous clock
    in the midi data, and starts storing at the time the clock should fall
``` in the subcode file, given the previous "lining up". Stores data with the bandwidth desired, clearing any packs in the midi part of the bandwidth that are unused, until all packs the remaining packs in the subcode file have been "passed". Displays error message if all midi data did not fit.

*****************************************************************/
```c
void save_subcode()
{
char  byte_val,mask1,mask2,stat_type;
long  cur_pack,packs_in_file,start_pack,start_midi_pack,first_pack_to_store;
int   i,m,n,cur_byte,cur_midi_byte,num_midi_bytes,pack_byte,pack_cnt;

if (end_event == start_event)
 {
  gotoxy(1,ERR_LINE);
  clreol();
  cputs("Nothing to save");
  return;
 }
gotoxy(1,STATUS_LINE);
cputs("Enter subcode file name, or Esc to abort : ");
strcpy(in_text,subc_name);
if (!getstr(0,TRUE))
   return;
strcpy(subc_name,in_text);
if (strchr(subc_name,'.') == NULL)
 {
  strcat(subc_name,".");
  strcat(subc_name,SUBC_EXT);
 } if ((subc_file = open(subc_name,O_WRONLY | O_BINARY)) == -1)
 {
  gotoxy(1,ERR_LINE);
  clreol();
  cprintf("Subcode file %s does not exist",subc_name);
  return;
 } if (lseek(subc_file,0L,SEEK_END) == -1L)
 {
  gotoxy(1,ERR_LINE);
  clreol();
  cprintf("Error writing to subcode file %s",subc_name);
  close(subc_file);
  return;
 } packs_in_file = tell(subc_file) / BYTES_PER_PACK;

if (packs_in_file % 10L != 0L)
 {
  gotoxy(1,ERR_LINE);
  clreol();
  cprintf("Number of packs in subcode file %s is not divisible by ten",subc_name);
```

```
     close(subc_file);
     return;
   } sprintf(in_text,"%d",start_second);
 while (TRUE)
 {
  gotoxy(1,STATUS_LINE);
  clreol();
  cputs("Enter number of seconds to start of audio : ");
  if (!getstr(2,TRUE))
  {
    close(subc_file);
    return;
  }
   start_second = atoi(in_text);
  gotoxy(1,ERR_LINE);
  clreol();
  if (start_second < 0)
    cputs("Must be positive");
  else
    break;
 } sprintf(in_text,"%d",start_frame);
 while (TRUE)
 {
  gotoxy(1,STATUS_LINE);
  clreol();
  cputs("Enter number of remaining frames to start of audio : ");
  if (!getstr(2,TRUE))
  {
    close(subc_file);
    return;
  }
   start_frame = atoi(in_text);
  gotoxy(1,ERR_LINE);
  clreol();
  if (start_frame < 0 || start_frame >= 30)
    cputs("Must be in range 0 - 29");
  else
    break;
 } start_pack = (start_second * 300) + (start_frame * 10);

cur_event = end_event;
 cur_event--;

if (cur_event->time + start_pack >= packs_in_file)
 {
  gotoxy(1,ERR_LINE);
  clreol();
  cprintf("Only %ld packs in subcode file %s, %ld needed",
          packs_in_file,subc_name,cur_event->time + start_pack + 1);
  close(subc_file);
```

```
  return;
 } sprintf(in_text,"%d",percent);
while (TRUE)
{
 gotoxy(1,STATUS_LINE);
 clreol();
 cputs("Enter percentage of subcode data used for midi (10, 50, 90, or 100) : ");
 if (!getstr(3,TRUE))
 {
   close(subc_file);
   return;
 }
 percent = atoi(in_text);
 gotoxy(1,ERR_LINE);
 clreol();
 if (percent != 10 && percent != 50 && percent != 90 && percent != 100)
   cputs("Percentage must be 10, 50, 90 or 100");
 else
   break;
} gotoxy(1,STATUS_LINE);
clreol();
pack_cnt = 0;

antilog[0] = 1;
for (n = 1; n <= 63; n++)
 antilog[n] = mult1(antilog[n-1]);
for (m = 0; m <= 62; m++)
{
 n = antilog[m];
 log[n] = m;
}
log[0] = 255;
for (n = 0; n <= 63; n++)
{
 mul6[n] = mult(n,3);
 mul21[n] = mult(n,59);
 mul39[n] = mult(n,54);
 mul18[n] = mult(n,15);
 mul1[n] = mult(n,2);
} for (cur_event = start_event; cur_event != end_event; cur_event++)
 if (cur_event->status != MIDI_CLOCK) break;
start_midi_pack = cur_event->time;
if (cur_event != end_event && cur_event != start_event)
  cur_event--;
first_pack_to_store = (cur_event->time - start_midi_pack) + start_pack;
if (percent == 50 || percent == 90)
 cur_pack = 1;
else
 cur_pack = 0;
while (cur_pack < packs_in_file)
```

```
{
for (i = 4; i < 20; i++)
 pack[i] = 0;
cur_byte = 0;

while ((cur_event->time - start_midi_pack) + start_pack <= cur_pack &&
        cur_event != end_event)
{
  stat_type = cur_event->status & 0xf0;
  if (stat_type < 0xc0)
   num_midi_bytes = 3;
  else
   if (stat_type < 0xe0)
     num_midi_bytes = 2;
   else
    if (stat_type < 0xf0)
      num_midi_bytes = 3;
    else
      num_midi_bytes = 1;
  if (cur_byte + num_midi_bytes > 10)
   break;
   for (cur_midi_byte = 0; cur_midi_byte < num_midi_bytes; cur_midi_byte++)
{
   switch (cur_midi_byte)
  {
  case 0 :
     byte_val = cur_event->status;
     break;
  case 1 :
     byte_val = cur_event->first_byte;
     break;
  case 2 :
     byte_val = cur_event->second_byte;
     break;
  }
   switch (cur_byte)
  {
  case 0:
  case 3:
  case 6:
  case 9:
   mask1 = byte_val >> 2;
   mask2 = ( byte_val << 4 ) & 0x3f;
   break;
  case 1:
  case 4:
  case 7:
   mask1 = byte_val >> 4;
   mask2 = ( byte_val << 2 ) & 0x3f;
    break;
  case 2:
  case 5:
  case 8:
    mask1 = byte_val >> 6;
    mask2 = byte_val & 0x3f;
    break;
  }
```

```
    pack_byte = 4 + cur_byte + ( cur_byte / 3 );
    pack[pack_byte] |= mask1;
    pack[pack_byte + 1] |= mask2;

cur_byte++;
  }
   cur_event++;
 }
 if (cur_pack >= first_pack_to_store)
    if (put_pack(cur_pack,cur_byte))
 {
   close(subc_file);
   return;
 }
 pack_cnt++;
 if (pack_cnt == 100)
 {
  pack_cnt = 0;
  gotoxy(1,STATUS_LINE);
   cprintf("Writing pack : %ld, hit Esc to abort",cur_pack);
   if (bioskey(1))
    if ((bioskey(0) & 0x00ff) == ESC)
   {
     close(subc_file);
     return;
   }
 }
  switch (percent)
 {
  case 10 :
   cur_pack += 10;
    break;
  case 50 :
   cur_pack += 2;
   break;
  case 90 :
   if (cur_pack % 10L == 9)
    cur_pack += 2;
   else
    cur_pack++;
   break;
  case 100 :
   cur_pack++;
   break;
 }
 }
close(subc_file);
if (cur_event != end_event)
{
 gotoxy(1,ERR_LINE);
 clreol();
 cprintf("All midi data did not fit in subcode file %s",subc_name);
}
else
 not_saved = FALSE;
}
```

```
/**************************************************************** int put_pack(long cur_pack,unsigned length)

Calculates parity symbols for current pack (pack) of given length
          (length), and stores these and the length in the current pack.
          Stores pack in subcode file at given pack location (cur_pack),
          returning FALSE if successfull, TRUE otherwise.

****************************************************************/
int put_pack(long cur_pack,unsigned length)
{
int i;
long file_off;

if (length == 0)
 for (i = 0; i < 24; i++)
  pack[i] = 0;
else
{
 pack[0] = 0x3d;
 pack[1] = 0x15;
 pack[17] |= length;
 calqpar();
 calpar();
} file_off = cur_pack * BYTES_PER_PACK;
lseek(subc_file,file_off,SEEK_SET);

if (write(subc_file,(void *) pack,24) == -1)
{
 gotoxy(1,ERR_LINE);
 clreol();
 cprintf("Error writing to subcode file %s",subc_name);
 return(TRUE);
}
return(FALSE);
}

/* calqpar - do the q parity symbols */
void calqpar()
{
   int n;
    unsigned a[2]; /* will contain the 2 parity symbols*/
    unsigned z;

/* see the "red book" by Sony and Philips for details on calculating
       "q" parity     */
} void calpar()
{
   int n;
    unsigned a[4]; /* contains 4 parity symbols */
    unsigned z;
```

```
/* see the "red book" by Sony and Philips for details on calculating
        "p" parity      */
} unsigned mult(p,q)
unsigned p,q;
{
   unsigned z;
   int pp,qq,zz;

if ( (p==0) || (q==0) )
      z = 0;
   else {
      zz = log[p] + log[q];
      if (zz > 62) zz = zz-63;
      z = antilog[zz];
   }
     return(z);
}

/************************************************************************* void   load_subcode()

Loads current midi data from subcode data file.  Prompts user with
   ----  last entered subcode file name (or default at start), and allows
        it to be changed.  Checks that subcode file exists, and that it is
        a multiple of ten packs (240) in length.  Allows user to change/enter
        bandwidth (10%,50%,90%,100%), then loads midi data from subcode file
        with the bandwidth desired, until all packs in the subcode file have
        been "passed".  This should only be used with subcode files that have
        been saved with no "lead-in" (time to start of audio), since the data
        in the lead-in portion would be viewed as midi data, but this is OK,
        since loading is only used to check the distortion induced by subcode
        translation.

*************************************************************************/
void   load_subcode()
{
char  byte_val,stat_type;
long  cur_pack,packs_in_file;
int   cur_byte,bytes_in_pack,cur_midi_byte,num_midi_bytes,pack_byte,pack_cnt;

gotoxy(1,STATUS_LINE);
cputs("Enter subcode file name, or Esc to abort : ");
strcpy(in_text,subc_name);
if (!getstr(0,TRUE))
  return;
strcpy(subc_name,in_text);
if (strchr(subc_name,'.') == NULL)
{
  strcat(subc_name,".");
  strcat(subc_name,SUBC_EXT);
}
```

```
if ((subc_file = open(subc_name,O_RDONLY | O_BINARY)) == -1)
{
 gotoxy(1,ERR_LINE);
 clreol();
 cprintf("Subcode file %s does not exist",subc_name);
 return;
} if (lseek(subc_file,0L,SEEK_END) == -1L)
{
 gotoxy(1,ERR_LINE);
 clreol();
 cprintf("Error reading subcode file %s",subc_name);
 close(subc_file);
 return;
} packs_in_file = tell(subc_file) / BYTES_PER_PACK;

if (packs_in_file % 10L != 0L)
{
 gotoxy(1,ERR_LINE);
 clreol();
 cprintf("Number of packs in subcode file %s is not divisible by ten",subc_name);
 close(subc_file);
 return;
} sprintf(in_text,"%d",percent);
while (TRUE)
{
 gotoxy(1,STATUS_LINE);
 clreol();
 cputs("Enter percentage of subcode data used for midi (10, 50, 90, or 100) : ");
 if (!getstr(3,TRUE))
 {
   close(subc_file);
   return;
 }
 percent = atoi(in_text);
 gotoxy(1,ERR_LINE);
 clreol();
 if (percent != 10 && percent != 50 && percent != 90 && percent != 100)
   cputs("Percentage must be 10, 50, 90 or 100");
 else
   break;
} gotoxy(1,STATUS_LINE);
clreol();
pack_cnt = 0;

cur_event = start_event;
if (percent == 50 || percent == 90)
 cur_pack = 1;
else
```

```c
 cur_pack = 0;
while (cur_pack < packs_in_file)
{
 if (get_pack(cur_pack))
 {
  end_event = cur_event;
  close(subc_file);
  return;
 } bytes_in_pack = pack[17] & 0x0f;
 cur_midi_byte = 0;
 cur_byte = 0;

while (cur_byte < bytes_in_pack)
 {
  pack_byte = 4 + cur_byte + ( cur_byte / 3 );

switch (cur_byte)
  {
   case 0:
   case 3:
   case 6:
   case 9:
    byte_val = (pack[pack_byte] << 2) | (pack[pack_byte+1] >> 4);
    break;
   case 1:
   case 4:
   case 7:
    byte_val = (pack[pack_byte] << 4) | (pack[pack_byte+1] >> 2);
    break;
   case 2:
   case 5:
   case 8:
    byte_val = (pack[pack_byte] << 6) | pack[pack_byte+1];
    break;
  } switch (cur_midi_byte)
  {
   case 0 :
    cur_event->status = byte_val;
    stat_type = byte_val & 0xf0;
    if (stat_type < 0xc0)
     num_midi_bytes = 3;
    else
     if (stat_type < 0xe0)
      num_midi_bytes = 2;
     else
      if (stat_type < 0xf0)
       num_midi_bytes = 3;
      else
       num_midi_bytes = 1;
    break;
   case 1 :
    cur_event->first_byte = byte_val;
```

```c
      break;
    case 2 :
       cur_event->second_byte = byte_val;
       break;
   }
    cur_midi_byte++;
    if (cur_midi_byte == num_midi_bytes)
   {
    cur_midi_byte = 0;
    cur_event->time = cur_pack;
    cur_event++;
   }
   cur_byte++;
  }
  pack_cnt++;
  if (pack_cnt == 100)
  {
   pack_cnt = 0;
   gotoxy(1,STATUS_LINE);
   cprintf("Reading pack : %ld, hit Esc to abort",cur_pack);
   if (bioskey(1))
     if ((bioskey(0) & 0x00ff) == ESC)
     {
        end_event = cur_event;
        close(subc_file);
        return;
     }
  }
  switch (percent)
  {
   case 10 :
     cur_pack += 10;
     break;
   case 50 :
     cur_pack += 2;
     break;
   case 90 :
     if (cur_pack % 10L == 9)
       cur_pack += 2;
     else
       cur_pack++;
     break;
   case 100 :
     cur_pack++;
     break;
  }
 }
 end_event = cur_event;
 close(subc_file);
}

/**************************************************************************** int get_pack(long cur_pack)

Loads current pack (pack) from given subcode file pack position
        (cur_pack).  Returns FALSE if successfull, TRUE otherwise.
```

```
int get_pack(long cur_pack)
{
long file_off;

file_off = cur_pack * BYTES_PER_PACK;
lseek(subc_file,file_off,SEEK_SET);

if (read(subc_file,(void *) pack,24) == -1)
{
 gotoxy(1,ERR_LINE);
 clreol();
 cprintf("Error reading to subcode file %s",subc_name);
 return(TRUE);
}
return(FALSE);
}
```

APPENDIX 2

```
define READNT 0x8000 char filename[ 80 ];

char pbuffer[ 16384 ];

main()
{
while( 1 )
{
printf("\nFile to playback:" );
gets( filename );

playback( filename );
}

}
/****************************************************************/ define BUFFER1 0x2c00
define BUFFER2 0x2dfc

/*
#define BUFFER1 0x3000
#define BUFFER2 0x31fc
*/ define S0 0xc0
define S1 0x80 playback(name)
char *name;
{
char z, i, stime[10];
```

```
long packs, delay, orig, origs, origb, distance, header = 0L;
/*int  inthnd();*/
int filout, wipei, status, flag=1;

if ((filout = open(name     , READNT)) == -1)
                {ioerr("opening"); return;}

/* skip 1st 4 bytes */
if ((status = read(filout,pbuffer, 48)) < 0)
                {ioerr("reading length"); return;} if ((status = readdat(1, filout, 1)) < 0)
                {ioerr("reading 1st 1"); return;}
if (status != 0)
      if ((status = readdat(2, filout, 0)) < 0)
                {ioerr("reading 1st 2"); return;} printf("TO EXIT PLAYBACK PRESS Ctrl.");
/*      wrk 11/20/87
 for (wipei = 0; wipei < 96 * 83; wipei++)
   pbuffer[wipei] = 0;

poke(BUFFER1, 0, pbuffer, 96 * 83);
 poke(BUFFER2, 6, pbuffer, 96 * 83);
*/
    if((i = key()) == 4)
    {
                if ((status = close(filout)) < 0) ioerr("closing");
                return;
    } delay = 0L;

orig = delay; origs = delay + 1260001 - 6641; origb = delay + 13320001 - 6641;
dmaseton();

if (status != 0)
{
while (1)
{
   if((i = key()) == 4)
              break;
   WAIT_INT();

if ((status = readdat(1, filout, 0)) < 0)
                {ioerr("reading 1"); return;}
   if (status == 0)
              break;

if((i = key()) == 4)
              break;
   WAIT_INT();
   if ((status = readdat(2, filout, 0)) < 0)
                {ioerr("reading 2"); return;}
   if (status == 0)
              break;
```

```
        }
    }
    WAIT_INT();

DMA_OFF();

if ((status = close(filout)) < 0) {ioerr("closing"); return;}
}

/*************************************************************************/ readdat(bufnum, filout, skipread)
int bufnum, filout, skipread;
{
int i, status;
unsigned offset, offsetl, segment, readidx;

struct SET
    {
        char    s0byte;
        char    s1byte;
        char    data96[98];
    };

struct SET set1;

char *set1pt;
char *readpt;
char *topt;

if (bufnum == 1)
    {
        segment = BUFFER1;
        offsetl = 0;
    }
else
    {
        segment = BUFFER2;
        offsetl = 6;
    } set1.s0byte = S0;
set1.s1byte = S1;

set1pt = &set1.s0byte;

offset = offsetl;

if( skipread )
    {
        status = 0;
```

```
}
else
{
        if ((status = read(filout,pbuffer, 96 * 83)) < 0)
                                                return(status);

} for( readidx = 0; readidx < status; readidx++ )
        if( pbuffer[ readidx ] == 0xff )
                pbuffer[ readidx ] = 0;

if( ( status < 96 * 83 ) && ( status > -1 ) )
        for( readidx = status; readidx < 96 * 83; readidx++ )
                pbuffer[ readidx ] = 0;

for (readidx = 0; readidx < 96 * 83; readidx += 96)
  {
            readpt = &pbuffer[readidx];
            topt = &set1.data96[0];
            movmem(readpt, topt, 96);
            set1pt = &set1.s0byte;
            poke(segment, offset, set1pt, 98);
            offset += 98;
  }
if( skipread )
return(1);
else
return( status );
}

/*******************************************************************/
ioerr(c)

char *c;
{
  printf("\nSorry, there was an error %s the file.",c);
}
/*******************************************************************/

TITLE **************** R..W DMA INTERFACE TEST PROGRAM   10/23/84 **
;
;
;
;
DATA SEGMENT WORD 'DATA'
;
;
;
;
DATA ENDS
;
;
PAGE, 132
;
;
```

```
DMA     EQU  0              ;DMA CONTROLLER IS AT IO PORT 0.
;
;DMABUF EQU 03000H

DMABUF  EQU 02C00H
;
;
pgroup    group   prog
prog      segment byte public 'PROG'
          assume cs:pgroup
;

;*********************************************************************
; begins ch 1 dma from 2c00:0 to 2c00:(83 * 98)d - wrap around mode.

dmaseton   proc near
           public dmaseton
           push bp
           push es
           mov bx, DMABUF
           mov es,bx
           mov bx,0
           mov cx, 83 * 98 * 2   ; 2 buffers of 83*98 each.
           call DMA_ON
           pop es
           pop bp
           ret
dmaseton   endp
;
;
;
;
;
;********  DMA CONTROL SOFTWARE  *************************************
;
;CONTAINS PROCEDURES TO INITIALIZE DMA CONTROLLER CH 1 FOR OUTPUT TO THE
;R..W DECODER INTERFACE BOARD, STOP DMA OUTPUT AND WAIT FOR CURRENT PLAYBACK
;BUFFER TO EMPTY.
;
;
;
;----------------------------------------------------------------------
;DMA_ON
; SETS UP DMA CHANNEL 1 FOR 7.35 KHZ TRANSFER OF VIDEO SUBCODE BYTES TO
; R..W DECODER INTERFACE BOARD.
; MODELED AFTER PROC DMA_SETUP IN BIOS FLOPPY DISK CODE.
; INPUT: ES:BX HAS STARTING ADDRESS OF OUTPUT BUFFER AREA.
;        CX HAS LENGTH OF OUTPUT BUFFER AREA.
; OUTPUT: DMA CONTROLLER IS INITIALIZED AND DMA IS STARTED.
;         AUTO INIT MODE RELOADS STARTING ADDRESS WHEN COUNT IS 0.
;----------------------------------------------------------------------
;
```

```
DMA_ON PROC NEAR
        public DMA_ON
PUSH CX                 ;SAVE BUFFER SIZE
CLI
OUT DMA+12, AL          ;SET FIRST BYTE FF.
PUSH AX                 ;DELAY
POP AX
MOV AL, 59H             ;MODE BYTE. CH=1,READ.AUTO.INC.SINGLE.
OUT DMA+11, AL
MOV AX, ES              ;ADDRESS SEGMENT
MOV CL, 4
ROL AX, CL
MOV CH, AL              ;HIGH NIBBLE OF ES TO CH
AND AL, 0F0H            ;SEG LOW NIBB = 0
ADD AX, BX
JNC J333
INC CH
J333:
OUT DMA+2, AL           ;START ADDRESS LOW BYTE
MOV AL, AH
OUT DMA+2, AL           ;SEND HIGH BYTE
MOV AL, CH              ; PAGE REGISTER BITS
AND AL, 0FH
OUT 83H, AL             ;SEND TO PAGE REGISTER.
POP CX                  ; GET BACK BUFFER SIZE
DEC CX                  ; ONE LESS
MOV AX, CX              ;COUNT TO AX
OUT DMA+3, AL           ; LOW BYTE OF COUNT
MOV AL, AH
OUT DMA+3, AL           ; SEND HIGH BYTE
STI
MOV AL, 01
OUT DMA+10, AL          ;ENABLE DMA TRANSFERS
;-------------------------------------------------------
;ADDITION OF NEW CODE (MM)
;-------------------------------------------------------
mov  dx,312h            ;SET 310 AND 311 TO OFF
in   al,dx
;
mov  dx, 310h           ;PORT ADDRESS
in   al, dx             ;SET U11-5 TO ENABLE
;
mov  dx,311h
in   al,dx
ret
;
DMA_ON ENDP
;
;
;_____
;DMA_OFF
; STOPS DMA ON CHANNEL 1 (VIDEO SUBCODE) BY SETTING CH 1 MASK BIT.
;_____
;
DMA_OFF PROC NEAR
        public DMA_OFF
```

```
        MOV AL, 05H
        OUT DMA+10, AL          ;SET CH 1 MASK BIT
;------------------------------------------------------------
;ADDITION OF NEW CODE (MM)
;
        mov  dx,312h            ;SET TO OFF (310 & 311)
        in   al,dx
;------------------------------------------------------------
;mov dx, 310h
;in al,dx
;mov dx,311h
;in al,dx
        RET
DMA_OFF ENDP ;------------------------------------------------------------
;TOGGLE PROC NEAR
;       public TOGGLE
;MOV DX,312H
;IN AL,DX
;RET
;TOGGLE ENDP
;------------------------------------------------------------
;
;
;
;
;_____
;WAIT_INT
; WAITS FOR A CHANGE IN THE BIT 15 OF THE DMA CONTROLLER'S OUTPUT COUNT
; REGISTER (INDICATING A BUFFER BOUNDRY CROSSING)
;_____
;
WAIT_INT PROC NEAR
         public WAIT_INT CALL GET_DMA_COUNT              ;GET VALUE OF DMA COUNT REGISTER.
SUB AX, 8134                    ;WHEN COUNT IS < 32730 BUFF_LOW IS EMPTY
JNC FINISH_LOW
FINISH_HIGH:                    ;WAIT FOR COUNT > 32760
CALL GET_DMA_COUNT
SUB AX, 8134                    ;LOOP UNTIL BIT 15 OF COUNT = 1
JC FINISH_HIGH
RET                             ;BUFF_HIGH IS EMPTIED
;
FINISH_LOW:
CALL GET_DMA_COUNT
SUB AX, 8134
JNC FINISH_LOW
RET
WAIT_INT ENDP
;
;
;
;
;
;
```

```
;_____
;GET_DMA_COUNT
; READS THE CONTENTS OF THE REMAINING COUNT REGISTER OF DMA CHANNEL 1.
; RETURNS THE COUNT IN AX.
;_____

GET_DMA_COUNT PROC NEAR
TRY_AGAIN:
OUT DMA+12, AL              ;RESET FIRST/LAST BYTE FF.
PUSH AX
POP AX
IN AL,DMA+3                 ;READ LS BYTE
IN AL, DMA+3                ;READ MS BYTE
MOV CH, AL
; READ AGAIN TO MAKE SURE OF STABLE READ
IN AL, DMA+3
MOV CL,AL
IN AL, DMA+3                ;HIGH BYTE
CMP AL, CH
JNE TRY_AGAIN               ;IF HIGH BYTE CHANGED- TRY AGAIN
MOV AX, CX
RET
GET_DMA_COUNT  ENDP
;
;
;
prog      ends
      end
```

We claim:

1. A system for storing MIDI information in subcode packs for encoding on a compact disc having a main channel and a subcode channel comprising:
   (a) a computer having a random access memory, a processor and coupled to a storage device;
   (b) MIDI source means for generating MIDI signals;
   (c) first interface means coupled to said MIDI source means and said computer for converting the MIDI signals to a form for loading into said memory for access by said processor;
   (d) program means for controlling the operation of said processor and said memory so as to convert the MIDI data in said memory to a plurality of subcode packs and writing said subcode packs to a storage medium on said storage device;
   (e) second interface means for retrieving said subcode packs on said storage medium and for coupling to a compact disc encoder for converting the MIDI data in the retrieved subcode packs to electric signals useable by the compact disc encoder to encode said MIDI data in the subcode channel on the compact disc.

2. The system defined by claim 1 wherein said program means comprises:
   (a) means for creating a subcode data file which is a multiple of at least one subcode pack in length and placing a first MIDI event in a predetermined position within a subcode pack in said subcode data file based upon a predetermined time such that said first MIDI event is placed relative to a start of audio data in said main channel, and placing all subsequent MIDI events in said subcode packs based upon said predetermined position, such that no individual MIDI event spans across more than one subcode pack;
   (b) means for calculating parity for each subcode pack which has been created and in which said MIDI events have been stored according to a predetermined parity calculation standard.

3. The system defined by claim 1 wherein said program means comprises:
   (a) means for creating a table in said memory which contains MIDI events generated by said MIDI source and a time relative to the time an initial MIDI event was generated by said MIDI source;
   (b) means for creating a subcode data file which is a multiple of ten subcode packs in length, accessing said table and placing a first MIDI event in a prdetermined position within a subcode pack in said subcode data file based upon said relative time such that said first MIDI event is synchronous to a MIDI clock, and placing all subsequent events in said subcode packs based upon said predetermined position, such that no individual MIDI event spans across more than one subcode pack;
   (c) means for calculating parity for each subcode pack which has been created and in which said MIDI events have been stored according to a predetermined parity calculation standard.

4. The system defined by claim 1 wherein said program means comprises:
   (a) means for creating a table in said memory which contains MIDI events generated by said MIDI source and a time relative to the time an initial MIDI event was generated by said MIDI source;

(b) means for creating a subcode data file which is a multiple of at least one subcode pack in length, accessing said table and placing a first MIDI event in a predetermined position within a subcode pack in said subcode data file upon said relative time such that said first event is synchronous to a MIDI clock, and placing all subsequent MIDI events in said subcode packs based upon said predetermined position, such that no individual MIDI event spans across more than one subcode pack;

(c) means for calculating parity for each subcode pack which has been created and in which said MIDI events have been stored according to a predetermined parity calculation standard.

5. The system defined by claim 1 wherein said program means causes up to 10 bytes of MIDI data to be stored in each of said subcode packs.

6. The system defined by claim 1 wherein said program means causes up to 11 bytes of MIDI data to be stored in each of said subcode packs.

7. The system defined by claim 1 wherein said program means causes up to 12 bytes of MIDI data to be stored in each of said subcode packs.

8. The system defined by claim 5 wherein said program means ensures that no more than 125 bytes of MIDI data are stored in any 12 consecutive subcode packs.

9. The system defined by claim 2 wherein said program means causes up to 10 bytes of MIDI data to be stored in each of said subcode packs.

10. The system defined by claim 2 wherein said program means causes up to 11 bytes of MIDI data to be stored in each of said subcode packs.

11. The system defined by claim 2 wherein said program means causes up to 12 bytes of MIDI data to be stored in each of said subcode packs.

12. The system defined by claim 9 wherein said program means ensured that no more than 125 bytes of MIDI data are stored in any 12 consecutive subcode packs.

13. A method for storing MIDI information in subcode packs for encoding on a compact disc having a main channel and a subcode channel using a computer having a random access memory, a processor and coupled to a storage device, said method comprising the steps of:

(a) generating MIDI signals from a MIDI source;

(b) converting the MIDI signals to a form for loading into said memory for access by said processor;

(c) controlling the operation of said processor and said memory so as to convert the MIDI data in said memory to a plurality of subcode packs and writing said subcode packs to a storage medium on said storage device;

(d) retrieving said subcode packs on said storage medium and converting the MIDI data in the retrieved subcode packs to electric signals for encoding said MIDI data in the subcode channel on the compact disc.

14. The method defined by claim 13 wherein said controlling step comprises the steps of:

(a) creating a subcode data file which is a multiple of ten subcode packs in length and placing a first MIDI event in a predetermined position within a subcode pack in said subcode data file based upon a predetermined time such that said first MIDI event is placed relative to a start of audio data in said main channel and placing all subsequent MIDI events in said subcode packs based upon said predetermined position, such that no individual MIDI event spans across more than one subcode pack;

(b) calculating parity for each subcode which has been created and in which said MIDI events have been stored according to a predetermined parity calculation standard.

15. The method defined by claim 13 wherein said controlling step comprises the steps of:

(a) creating a table is said memory which contains MIDI events generated by said MIDI source and a time relative to the time an initial MIDI event was generated by said MIDI source;

(b) creating a subcode data file which is a multiple of ten subcode packs in length, accessing said table and placing a first MIDI event in a predetermined position within a subcode pack in said subcode data file based upon said relative time such that said first MIDI event is synchronous to a MIDI clock and placing all subsequent MIDI events in said subcode packs based upon said predetermined position, such that no individual MIDI event spans across more than one subcode pack;

(c) calculating parity for each subcode pack which has been created and in which said MIDI events have been stored according to a predetermined parity calculation standard.

16. The method defined by claim 14 wherein said creating step causes up to 10 bytes of MIDI data to be stored in each of said subcode packs.

17. The method defined by claim 14 wherein said creating step causes up to 11 bytes of MIDI data to be stored in each of said subcode packs.

18. The method defined by claim 14 wherein said creating step causes up to 12 bytes of MIDI data to be stored in each of said subcode packs.

19. The method defined by claim 16 wherein said creating step ensures that no more than 125 bytes of MIDI data are stored in any 12 consecutive subcode packs.

20. The method defined by claim 15 wherein said creating step causes up to 10 bytes of MIDI data to be stored in each of said subcode packs.

21. The method defined by claim 15 wherein said creating step causes up to 11 bytes of MIDI data to be stored in each of said subcode packs.

22. The method defined by claim 15 wherein said creating step causes up to 12 bytes of MIDI data to be stored in each of said subcode packs.

23. The method defined by claim 20 wherein said creating step ensures that no more than 125 bytes of MIDI data are stored in any 12 consecutive subcode packs.

* * * * *

UNITED STATES PATENT AND TRADEMARK OFFICE
CERTIFICATE OF CORRECTION

PATENT NO. : 4,942,551

DATED : 7/17/90

INVENTOR(S) : Klappert et al

It is certified that error appears in the above-identified patent and that said Letters Patent is hereby corrected as shown below:

Col. 4, line 18, delete "1" and insert --11--.

Col. 4, line 59, delete "$SUBCODE_{13}$" and insert --$SUBCODE_{-}$--.

Signed and Sealed this

Twenty-fifth Day of May, 1993

Attest:

MICHAEL K. KIRK

Attesting Officer

Acting Commissioner of Patents and Trademarks